US006560592B1

(12) United States Patent
Reid et al.

(10) Patent No.: US 6,560,592 B1
(45) Date of Patent: May 6, 2003

(54) MULTI-MODEL COMPUTER DATABASE STORAGE SYSTEM WITH INTEGRATED RULE ENGINE

(75) Inventors: Jon D. Reid, West Lafayette, IN (US); S. Terry Brugger, Brentwood, CA (US)

(73) Assignee: Micro Data Base Systems, Inc., West Lafayette, IN (US)

(*) Notice: Subject to any disclaimer, the term of this patent is extended or adjusted under 35 U.S.C. 154(b) by 0 days.

(21) Appl. No.: 09/273,024

(22) Filed: Mar. 19, 1999

Related U.S. Application Data

(60) Provisional application No. 60/078,613, filed on Mar. 19, 1998.

(51) Int. Cl.[7] .................................................. G06F 17/30
(52) U.S. Cl. ................................. 707/2; 706/2; 706/6
(58) Field of Search ............................. 707/2, 10, 103, 707/503, 104.1, 3; 706/62, 1, 25, 2, 15, 13, 20, 52, 29, 4, 19, 48, 23, 47, 14, 45, 12, 17, 21, 6

(56) References Cited

U.S. PATENT DOCUMENTS

| | | | | |
|---|---|---|---|---|
| 5,267,180 A | * | 11/1993 | Okayama | 364/571.03 |
| 5,615,112 A | * | 3/1997 | Liu Sheng et al. | 395/615 |
| 5,642,410 A | * | 6/1997 | Walsh et al. | 379/201 |
| 5,680,470 A | * | 10/1997 | Moussa et al. | 382/119 |
| 5,701,400 A | * | 12/1997 | Amado | |
| 5,713,014 A | | 1/1998 | Durflinger et al. | |
| 5,812,850 A | * | 9/1998 | Wimble | 395/704 |
| 5,900,004 A | * | 5/1999 | Gipson | 707/530 |
| 5,940,820 A | * | 8/1999 | Kagiwada | 707/3 |
| 5,984,786 A | * | 11/1999 | Ehrman | 463/42 |
| 6,088,717 A | * | 7/2000 | Reed et al. | 709/201 |

* cited by examiner

*Primary Examiner*—Jean M. Corrielus
*Assistant Examiner*—Tam Nguyen
(74) *Attorney, Agent, or Firm*—Woodard, Emhardt, Naughton, Moriarty & McNett LLP

(57) ABSTRACT

In one form of the invention, a computer database storage system is disclosed, comprising a data storage medium adapted to store a plurality of pieces of information, at least one piece of data stored in the data storage medium, and at least one rule stored in the data storage medium, each said at least one rule comprising a premise, an action, wherein the action is performed if the premise is determined to be true, an alternate action, wherein the alternate action is performed if the premise is determined to be false, and a trigger, wherein the trigger causes evaluation of the premise upon the occurrence of a predetermined event.

23 Claims, 18 Drawing Sheets

```
DATABASE ETdemo
    LOGICAL 'ETdemo'

CSP 'c:/empsdll/debug/emps.dll'
-- dynamically loaded C Stored Procedure (CSP) executable
-- created by rule set compiler from rule set definition Base Table Employees
    UPDATE TRIGGER "TRULES_TRIGGER_ENGINE"
    Employee.EmployeeName      AS Name
    Employee.EmployeeIDNumber  AS IDNumber
    Employee.Salary            AS Salary
FROM EmployeesByIDNumber
```

Fig. 10

MULTI-MODEL COMPUTER DATABASE STORAGE SYSTEM WITH INTEGRATED RULE ENGINE

This application claims the benefit of provisional application Ser. No. 60/078,613 filed Mar. 19, 1998.

TECHNICAL FIELD OF THE INVENTION

The present invention generally relates to computer database storage systems and, more particularly, to a multi-model computer database storage system with integrated rule engine.

BACKGROUND OF THE INVENTION

Rules serve to model business logic. A rule is an atomic statement (a statement which can't be broken down to simpler statements) describing some aspect of the business's operation. Rules serve as guides for managers and employees for how they should act and what they should do in certain situations. These rules can be stored in the computer system. By doing so, the rules are easily accessible by all employees. As modern businesses must be very dynamic, a central repository also allows for easy rule modification and update. A smart database can use the rules in this repository to control its execution. These rules can cover all aspects of the business, from when to reorder supplies to the diagnosis of medical illnesses. Some rules have no applicability to a smart database (such as employee dress code), while others are much easier to use through the implementation of a smart database (like a 10000 rule set diagnosing respiratory illnesses). We will focus on rules which can be used to control the database; however, our system will allow for all types of rules.

As we are talking about a potentially huge number of rules (millions for a hospital which has numerous medical diagnosis systems as well as administrative rules), we must have some way to organize them all. We do this through the use of business objects. A business object encapsulates all the rules controlling a particular aspect of the business.

When a rule influences the database, we say that it "fires". This is keeping with traditional expert system terminology. In order for a rule to fire, its condition must evaluate to true. The database may evaluate rules either implicitly or explicitly. While a rule, by itself, may be ambiguous as to when it is evaluated, its position in the set of business objects will dictate which way it is evaluated. In general, rules which are automatically evaluated control some aspects of the business whereas rules which are explicitly evaluated provide information for a query. Rules which provide information for a query are essentially the same as rules in expert systems. This aspect of our business rules engine is called a decision support system.

Decisions are often difficult to make. They require making seemingly ambiguous relations between the data. Fortunately, we can model this ambiguity in the form of fuzzy variables. For a certain piece of data, we may consider multiple values, and each value will have a certainty factor assigned to it. The mathematical operations relating these fuzzy variables are well defined.

Computers are not infallible because they are programmed by fallible creatures. Therefore, users will need to validate results after a query. A how and why mechanism will explain to the user why a particular decision was made. One of the advantages of the rules paradigm is that if the logic is flawed, the incorrect rule can be quickly and easily fixed. Sometimes the logic is not flawed, but just skewed. In this case, it usually means that two rules which are both contributing to a solution have incorrect weights. There will be a feedback mechanism such that users can identify if a decision was correct or incorrect. Based on that feedback, the relative weight of the rules will be adjusted. This is similar in mechanism to a neural network; however, a neural network is a "black-box" design. This mechanism will be overt and accessible to the rule set administrators.

Many times a decision must be made between various objects which must be evaluated on the basis of numerous properties. This problem usually falls under the classification of data mining. While these decisions can be modeled by rules, they often require an inordinate number of rules which is cumbersome at best. Instead, we can model these with a special type of rule, called a sorting rule. A sorting rule allows us to not only pick the best of class, but also a range, like the 5 best, or to even view all the data sorted by multiple values of varying importance.

While some values that we want to sort by, such as cost, have a well defined relation between values (a simple numeric greater than/less than), others, such as location, are not so well defined. Hence, we allow our users to create value maps, where they place the different values (such as city names) on a 2D (potentially 3D or maybe even 4D) grid to map the relative importance of one value towards another.

Some data, such as that often stored in blobs cannot be easily related even through maps. Therefore, we will also provide a neural network which can learn from the available data and assign according certain factors to various fields. We should provide neural nets which recognize the most common types of blobs, such as bodies of text, JPEGs or PNGs. Neural nets provide the additional advantage that they can deduce relations between fields of data that were not previously recognized.

What is interesting here is that we've gone from expert systems to neural nets, sometimes considered to be different ends of the AI spectrum. FIG. 1 illustrates this relationship.

We start at rule-centric programming. Rules use fuzzy variables to aid in decision support. Rules are also used to define patterns when doing data mining. Pattern searching also relies on fuzzy variables to define relations between the elements. Data mining can also take advantage of neural networks.

Given the technologies that comprise a smart database, we must consider what makes the database actually "smart". A smart database is one which uses the knowledge base available to it (in the form of business objects and learned neural data) to reduce the workload of the user. It will also potentially increase their accuracy and precision. It does this by enforcing relations between the data, automatically filling in fields and providing recommendations to the user to aid in the decision making process.

Everything that has been proposed here is possible with today's databases, except that the burden of providing a rules engine and/or neural network is put on the application programmer, who often has little experience with such components. Many rules can be handled with just triggers, except that many more do require a true rules engine, and we want a common interface for all rules. Further, most rules can be embedded in procedural code. However, that is where they are put today. But procedural code is difficult to maintain. Rules change often in today's business marketplace, hence IS departments want to make changes in real-time to the rules. They do not want to recompile an application or take down the database to link in the new code.

Further, IS departments do not want to add rules until they are tested and known to work properly. For this reason, a smart database must provide an environment for testing and debugging rules before they are put into effect. This environment will integrate seamlessly with the rule editor and feedback mechanism such that rules can be edited while a debugging session is taking place, and those changes will be reflected immediately in the session. As this environment is meant for testing and debugging, it will operate on a replicate of the data so that the original data will not be adversely changed.

We need to provide this dynamic environment because today's business environment is changing faster than anyone can keep up with. The rule-based environment relieves most of the burden off of IS departments, but we can aid IS departments even more with the addition of temporal information to rules. Temporal information allows rules to be in affect between certain times or after a certain date. This is particularly advantageous when a new policy takes effect sometime in the future, but we want to set up the database for the change now so that it automatically takes affect at the specified time.

The storage and use of temporal information means that we may have multiple versions of the same rule or business object. We handle these through the use of a rule repository. A repository of the different versions of a rule or business object has the added advantage that rules can be easily reverted to earlier versions (for instance, if an unforeseen problem arises with the new one). Furthermore, multiple people can work on the set of rules and business objects without interfering with each other.

SUMMARY OF THE INVENTION

The present invention is an integral part of a computerized database system. All existing business rules engines sit on top of a relational database as a separate component. This means that all database access must go through them, or else the rules will not be enforced. This extra layer to data access slows performance of the application using the database. This is especially true for access to data not affected by the rules. In the present invention, through the use of triggers, only access to data affected by rules will experience any slow down through a check by the business rules engine. An additional disadvantage to accessing a database through a prior art rules engine is that the user cannot use any of the unique features of the database. They are limited to the standard methods implemented by the rules engine. By integrating the database engine with the rules engine in the present invention, we overcome this disadvantage. In particular, this means the use of multiple models to access the data. Finally, integration with the database engine allows storage of fuzzy data types (which are very useful for rule-based processing) in the database.

Rules are stored in the database engine to speed access. Storage of the rules in the database also forms an inseparable link between the rules and the data they act on.

Three technologies that have been developed, or have developed significantly in the past 13 years are fuzzy queries, neural networks and graphical display technologies. We take advantage of all three in the present invention. Fuzzy queries allow the user to find data without making an exact match on the item. The relation between data items can either be intrinsic (i.e. if the data are integers, then 90 is closer to 100 than 10), or it can be defined through the use of a value map. A value map is a graphical representation of the possible data items, with the distance between the items indicating how closely related they are.

The present invention also introduces the concept of using a fuzzy query as a rule, which we call a "Sorting Rule." A Sorting Rule allows some or all of the data used in the execution of the rules engine to come from the result of a fuzzy query.

The present invention also integrates neural networks through their use as value maps in fuzzy queries. This means that, rather than make the user form a graphical representation of the data items, the neural network will form its own model of the relations between data items. This provides the advantages of freeing the user from doing additional work, potentially better accuracy in evaluating relationships, and the ability to infer the relationships between data items that were not present in the original data sample.

Neural networks are also used as rules. This is a revolutionary concept as researchers and developers of rules systems and neural networks have traditionally taken what they consider to be opposite views of AI. One way in which a rule can be used is to change the value of a variable, goal or set based on a set of inputs. A neural network can also change the value of a variable, goal or set based on a set of inputs. The difference is that a traditional rule defines in what way the variable, goal or set is changed by means of a set of statements in some type of language. A neural network determines, through training on examples of what an output should be given some input, how the input affects the output. Hence, the present invention allows the use of either traditional rules, defined through the use of statements in a language, or neural networks to define a rule.

Advances in display technology allow us to make the development of the rule-set easier. Specifically, the present invention allows the rules to be debugged in a graphical manner, where the user gets visual feedback from a diagram of the rules as to where in the execution of their rules they are. This provides additional advantages, such as fast retrieval of information on execution during execution.

In one form of the invention, a computer database storage system is disclosed, comprising a data storage medium adapted to store a plurality of pieces of information, at least one piece of data stored in the data storage medium, and at least one rule stored in the data storage medium, each said at least one rule comprising a premise, an action, wherein the action is performed if the premise is determined to be true, an alternate action, wherein the alternate action is performed if the premise is determined to be false, and a trigger, wherein the trigger causes evaluation of the premise upon the occurrence of a predetermined event.

A multi-model computer database storage system, comprising a data storage medium adapted to store a plurality of pieces of information; at least one piece of data stored in the data storage medium; and at least one rule stored in the data storage medium, each said at least one rule comprising a premise; an action, wherein the action is performed if the premise is determined to be true; an alternate action, wherein the alternate action is performed if the premise is determined to be false; and a trigger, wherein the trigger causes evaluation of the premise upon the occurrence of a predetermined event.

A multi-model computer database storage system, comprising a data storage medium adapted to store a plurality of pieces of information; at least one piece one piece of data stored in the data storage medium; at least one rule set stored in the data storage medium, each said at least one rule set comprising a plurality of rules that are each executed whenever said rule set is triggered; and at least one trigger, wherein each said at least one trigger causes execution of at least one of said rule sets upon the occurrence of a predetermined event.

A multi-model computer database storage system, comprising a data storage medium adapted to store a plurality of pieces of information; a plurality of data stored in the data storage medium according to a plurality of logical data models; at least one rule stored in the data storage medium; a database engine operative to store and retrieve data to and from the data storage medium according to any of the plurality of logical data models; and a rule engine integrated with the database engine such that said at least one rule can be executed in the context of any of the plurality of logical data models.

A multi-model computer database storage system, comprising a data storage medium adapted to store a plurality of pieces of information; at least one piece of data stored in the data storage medium; at least one rule stored in the data storage medium; and a trigger, wherein the trigger causes execution of at least one of the at least one rule upon the occurrence of a predetermined event that is not a change to the data.

A multi-model computer database storage system, comprising a database storage medium adapted to store a plurality of pieces of information; at least one piece of data stored in the data storage medium; at least one rule stored in the data storage medium; at least one trigger, wherein the at least one trigger causes execution of at least one of the at least one rule upon the ccurrence of a predetermined event; and a debugging tool operative to graphically display at least one of the at least one rule and at least one of the at least one piece of data and logical interconnections therebetween, wherein said display of a particular rule or data changes appearance as said particular rule is executed and said particular data is utilized in a rule execution.

BRIEF DESCRIPTION OF THE DRAWINGS

FIG. 10 is an example of a database table definition file with trigger definitions according to the present invention.

DETAILED DESCRIPTION OF THE PREFERRED EMBODIMENTS

Figure 1:
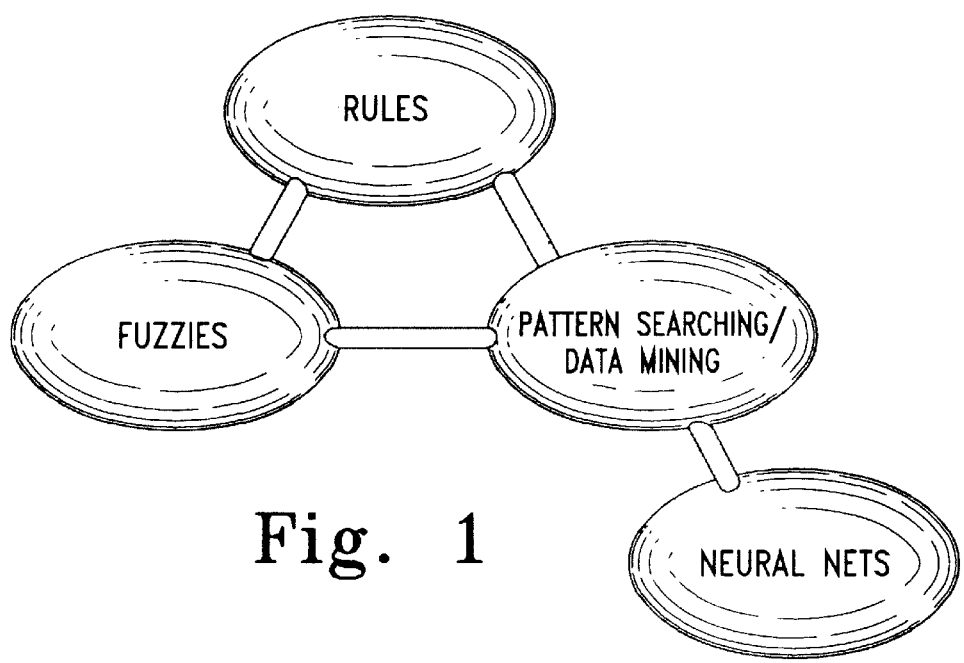
FIG. 1 is a schematic diagram illustrating various relationships between various tools used in the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

The business rules engine of the present invention is configured for integration with a computerized database system, such as that described in U.S. Pat. No. 5,713,014 entitled MULTI-MODEL DATABASE MANAGEMENT SYSTEM ENGINE FOR DATABASE HAVING COMPLEX DATA MODELS, the specification and drawings of which are hereby incorporated by reference herein in their entirety.

Application Example

As an example of the numerous ways in which a smart database engine might be used, we'll outline some points from a fictitious application called Academia, a package designed to aid in the administration of post-secondary schools ranging from vo-tecs to large universities.

Academia handles common aspects that administrators of post-secondary schools must deal with, such as the admission of new students, assignment of scholarships, class schedules, teaching assignments, room assignments or roommate assignments at on-campus housing. (There are various modules all designed to work together, which the school purchases based on its needs.) Of course, it includes packages to handle aspects which all businesses must deal with, such as accounting, stores and human resources.

We'll start by looking at a couple simple rules:

Applicants for enrollment must have or be scheduled to receive a secondary education degree (such as a high school diploma or GED certificate) before they enroll as full-time students.

Classes must take place between 07:00 and 21:00, Monday through Friday or between 08:00 and 12:00 Saturday.

Those seem simple enough. They are enforced by the database. Hence, if information for an applicant does not include secondary degree information, the person can not be added to the system as an applicant. Likewise, if someone tries to create a class like Witchcraft-101 which takes place Monday at midnight, the system will not let them do it. Now let's consider a business object for the restocking of acids in the chemistry stores.

There must always be sufficient levels of HCl, HF and sulfuric acid.

There must always be at least 5 l of HF acid.

There must always be at least 20 l of HCl acid.

There must always be at least twice as much sulfuric acid as HCl acid.

Figure 2:
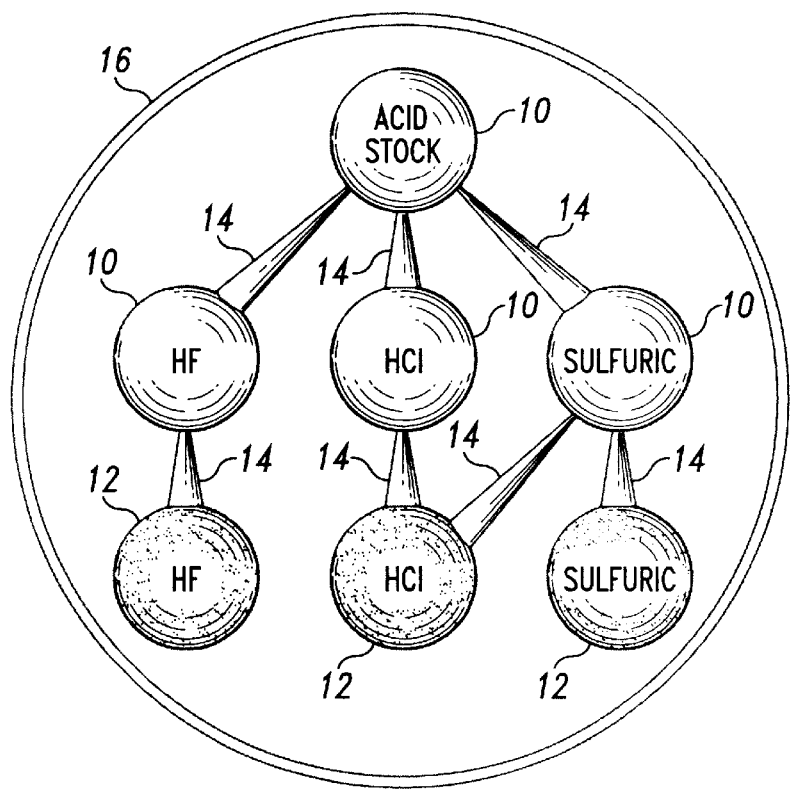
FIG. 2 is a first schematic diagram of a business object of the present invention.

We can visualize this object as shown in FIG. 2

Here the goals and rules are represented by green dots 10. The data is represented with red dots 12. Relations between the rules and with the data are shown as blue arrows 14. The entire system is encapsulated as an object 16.

The goal for the object is that there must always be sufficient levels of HCl, HF and sulfuric acid. What happens when this rule is violated is ambiguous. The system may automatically reorder the needed chemicals, send mail to the stores administrator to order some more, or even display a message to the person working in the stores informing them that no more acid may be distributed until it is restocked. This goal is reached through the evaluation of three rules. This is an example of rules which are grouped into a business object which is automatically evaluated whenever one of the three data elements changes.

Let's look at an object that must be queried. As students complain that textbooks change too often, some rules have been established for changing textbooks.

If the accreditation boards require that we update a textbook, it must be changed.

If the textbook is out of print, it can be replaced. This is granted more weight if the existing copies are scarce.

If students love the textbook, it should not be replaced. If they hate the textbook, it should be replaced.

If the information in the textbook is inaccurate or out of date, then it should be replaced.

If there is some incentive to change, it will be given more weight.

If the textbook is written by a professor at our institution, more weight will be given to keeping it.

Most of these rules seem very subjective, with the rules outlining the amount of weight a particular characteristic (of the text) has on the decision. This is where modeling with fuzzy variables becomes useful. Let's restate the rules with exact values assigned for these different weights. We will assign the result to our goal variable, Change Textbook (as this is our end goal, we'll also use it for the name of the object). Change Textbook (the goal) is a logical, so we assign certainties for both wanting to change the text (true) or not wanting to change the text (false).

If the accreditation boards require that we update a textbook, it must be changed.

If the textbook is out of print:

If copies are difficult to find, add a certainty level of 75% certainty to true.

Else add a certainty level of 25% certainty to true.

If the information in the textbook is inaccurate, or out of date, add a certainty level of 75% certainty to true.

Based on student feedback (from class evaluations which allow a rating of 1 to 5):

If the average score is 1, add certainty level of 50% certainty to true.

If the average score is 2, add certainty level of 25% certainty to true.

If the average score is 4, add a certainty level of 25% certainty to false.

If the average score is 5, add a certainty level of 50% certainty to false.

For every $1000 of incentive by a single publisher to change, add a certainty level of 10% certainty to true.

If the textbook is written by a professor at our institution, add a certainty level of 10% certainty to false.

An example of it in action: Say we have a textbook which is out of print, hard to find and has out of date information (no, really, people will land on the moon someday). On the other hand, students love the book hands down (they all give it a 5), perhaps because it was written by their professor. So we end up with a certainty level of 94% certainty (93.75 rounded up) that it should be changed (based on probabilistic math on certainty factors) and a certainty level of 55% that it should be kept. True wins out and the book gets replaced.

One problem with this system is that there is no entry on the class evaluation form for an overall rating of the book. The class evaluation only rates readability, examples and appropriateness. So we need an object nested inside the Change Textbook object to determine the overall score for the text. This object will be called Text Score, but this time the goal will be named Student Feedback:

readability score (a variable) will be calculated by assigning a certainty to each value (1 to 5) equal to the percent of students which gave it that value on the evaluation.

example score will be calculated in the same way.

appropriate score will also be calculated in the same way.

Student Feedback is 30% the readability score, 30% the example score and 40% the appropriate score.

Figure 3:
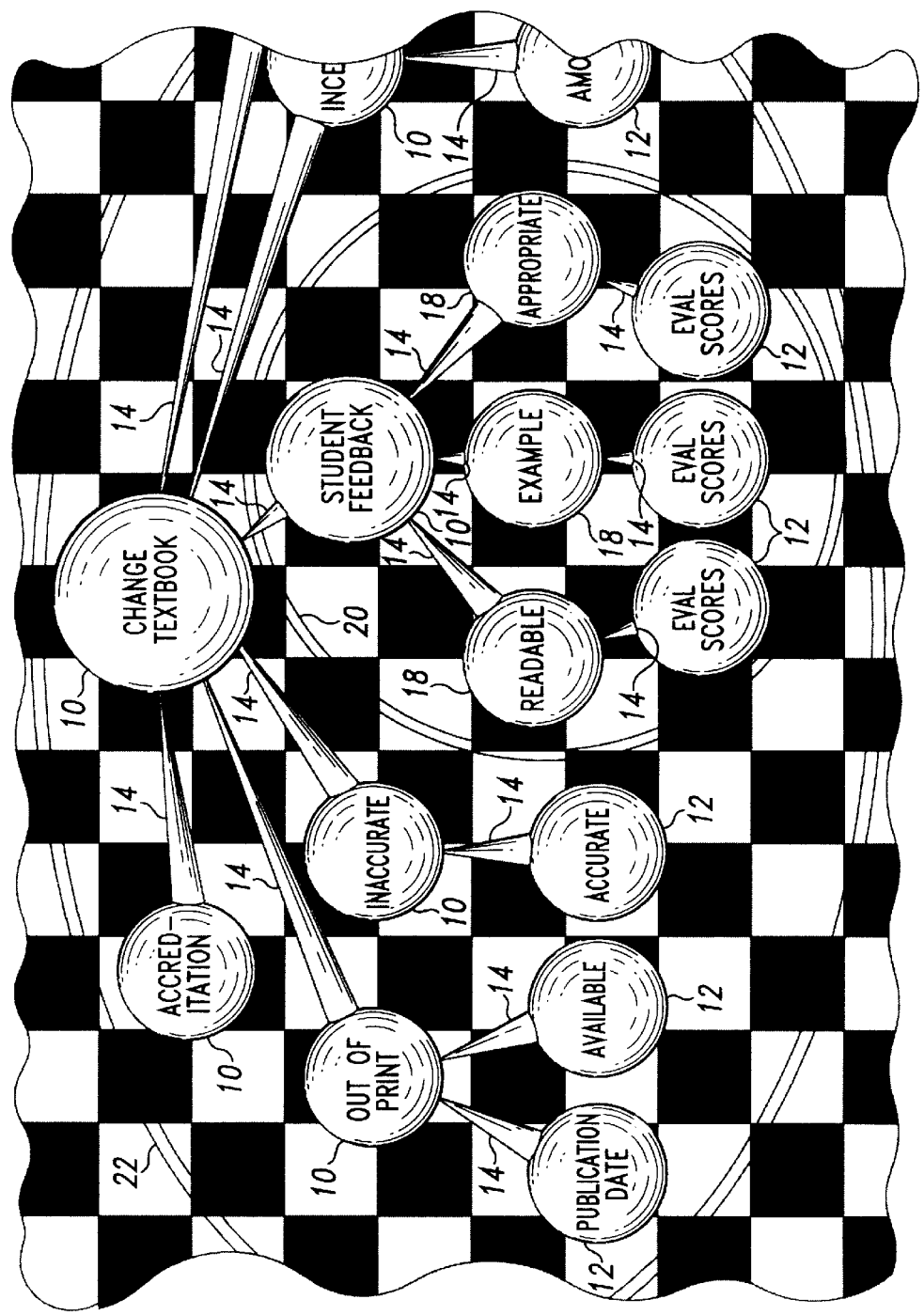
FIG. 3 is a second schematic diagram of a business object of the present invention.

FIG. 3 illustrates the entire Change Textbook object.

Again, green dots 10 are representing goals and rules, red dots 12 for data and blue arrows 14 for relations. We introduce purple dots 18 as variables. The other thing to note is that the Text Score object 20 is encapsulated inside the Change Textbook object 22. It must be pointed out that this graphic is only one way to visualize the data. In an actual system, variables and data would be modeled the same way, the blue arrows 14 would be the rules themselves and all the green dots 10 would be goals.

Rules can have a different effect on the results depending on how the rules and object are configured. In the Change Textbook example, all of the rules are evaluated and 4 are fired. However, we would put a flag on the rule about accreditation so that if it is fired, we consider the solution to be found (Change Textbook is true). We also assign a higher priority to the accreditation rule so that it is fired first. We could tell the entire Change Textbook object 22 to stop as soon as it finds some value for Change Textbook; therefore, in our above example it could have returned either true or false depending on the priorities of the other rules and the order they were evaluated in.

Users may also need to add in rules. Say Prof. Alhoph is doing research on Bovines and he must do that research every morning. As a result, he can not teach in the morning. Hence, he adds in a rule that, "Classes taught by Dr. Alhoph must be after noon." One of the advantages that we have with the present invention is that we can permit or deny the addition of types of rules based on the user permissions. In this case, we will give professors the ability to provide rules pertaining to scheduling for themselves. We might require that rules pertaining to scheduling of students be entered by their advisor or counselor.

This example is a prime example of the advantages of rules based systems and why rules should be simple to state (for instance in natural language). There is no way that the schedule requirements for professors could be entered into procedural code: that means the code would need to be recompiled at least once a semester! And even with a rules based system, the IS department isn't going to enter 10000 rules for the scheduling requirements of professors, much less the 100000 for students! That is why schools still do class schedules by hand without regard to the schedules of their students. We can presume that professors and advisors, like most professionals, are intelligent enough to enter a rule in contorted natural language. It is likewise not safe to presume that they can do the same in SQL or C.

As an example of a sorting rule, let's consider who should receive the John Flash Award. The John Flash Award goes to a sophomore who has demonstrated the ability to balance school and work. The award pays tuition for the student for three years. The award goes to the student who works the most number of hours a week (as certified by their supervisor) and who has the highest GPA. Some preference is given for students living off campus, with a little more preference given if it Is not known where the student lives. Some preference is also given to students who have not been sick or injured as well. Students who were hit by cars are disqualified. As a result, we produce a JF Award Object with a goal of recipient. The recipient is defined by a rule to be the best from the candidates. Candidates is a set created with two rules:

Candidates are students that are in the sophomore class.

Candidates may not have been hit by a car.

Figure 4:
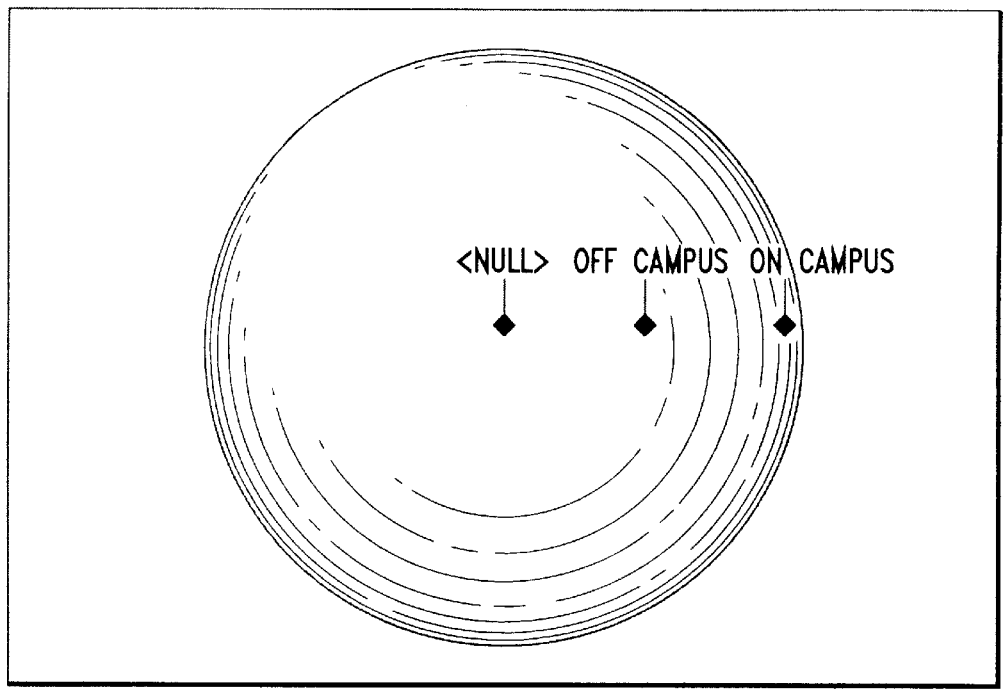
FIG. 4 is a schematic diagram of a value map of the present invention.

The candidates set is sorted with a sort rule which assigns a high importance on high GPA, a high importance on high work hours, a low importance on low illness and a low importance on housing as defined by a map with a goal of <null>. Note that low importance means that it is less important than GPA or work hours, not that it is important to be sick a lot. The housing map is shown in FIG. 4.

Figure 5:
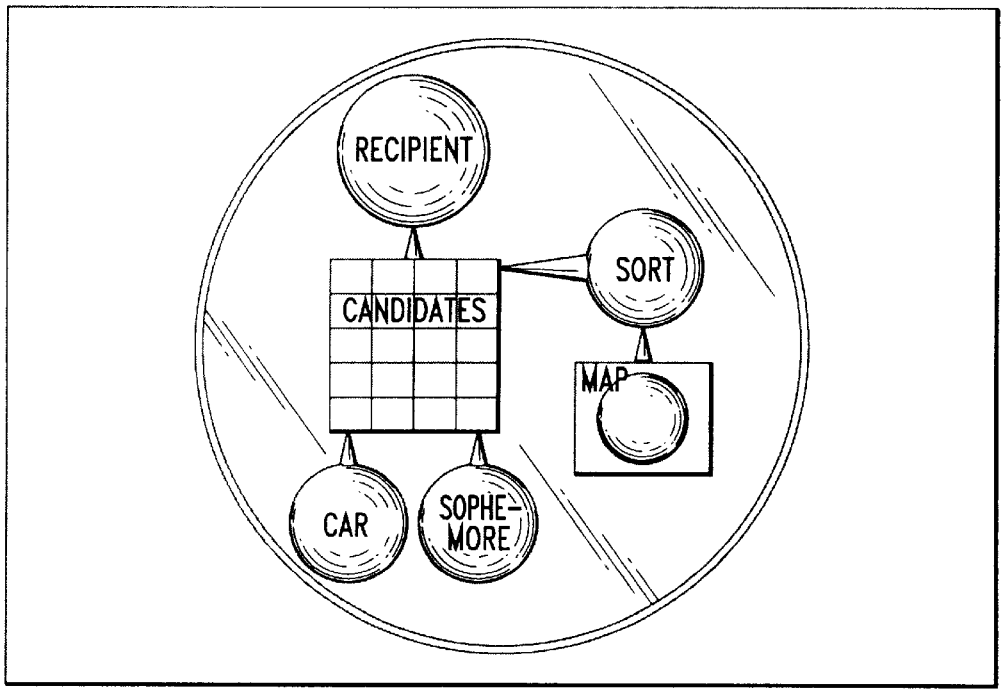
FIG. 5 is a third schematic diagram of a business object of the present invention.

Here, the closer a value (which is a text string) is to <null>, the higher its score. We used <null> to model unknown even though some argue that this is not the best way to do it. While this map looks a little sparse, imagine a map of all the zip codes in the United States. The entire JF Award Object is shown in FIG. 5.

The original data has been omitted for the purposes of simplicity. All the rules receive their data from the appropriate columns of the candidates table.

The accounting portion of the Academia package has a few rules which are particularly instructive. They are:

If a student's outstanding bill becomes more than $10000, suspend their library privileges.

A student can not withdraw more money from their available student loan money than what is in the account.

When a student transfers student loan money from their available student loan money account to their outstanding bill account, the sum of the two accounts must be the same before the transfer as after the transfer.

The first rule will fire as soon as the condition (bill>10000) is met, even in mid-transaction. The second rule should fire at the beginning of the transaction, if the condition is true, the transaction will be aborted before any work is done (and hence wasted). The final rule requires the state of the system both before and after the transaction to be known; however, its premise can not be evaluated until the system is ready to commit.

Our final example is useful particularly because it is difficult to state in anything other than natural language, therefore it is useful for evaluating how easy a language would be to use. "Do not delete a student record if they are still taking classes."

The rest of the Academia example has been omitted as it is really quite a huge product.

Structural Framework

The examples present a framework of requirements. Most generally, we will need an inference engine. This must be explicitly stated as it has been observed that most of the same effects can be achieved solely with triggers. That is, a rule changes a piece of data that causes another rule to fire and so on. However, for complex queries, such as the Change Textbook example above, a true inferencing engine is necessary. To avoid constant evaluation of all possible rules (which is possible, but stupid), we need triggers. The rules can set the triggers to fire those rules, either just before or after an operation or transaction. The triggers can be set at creation or modification time, or when the database is loaded. Hence, a trigger will act kind of like a wake up call for a rule.

Figure 6:
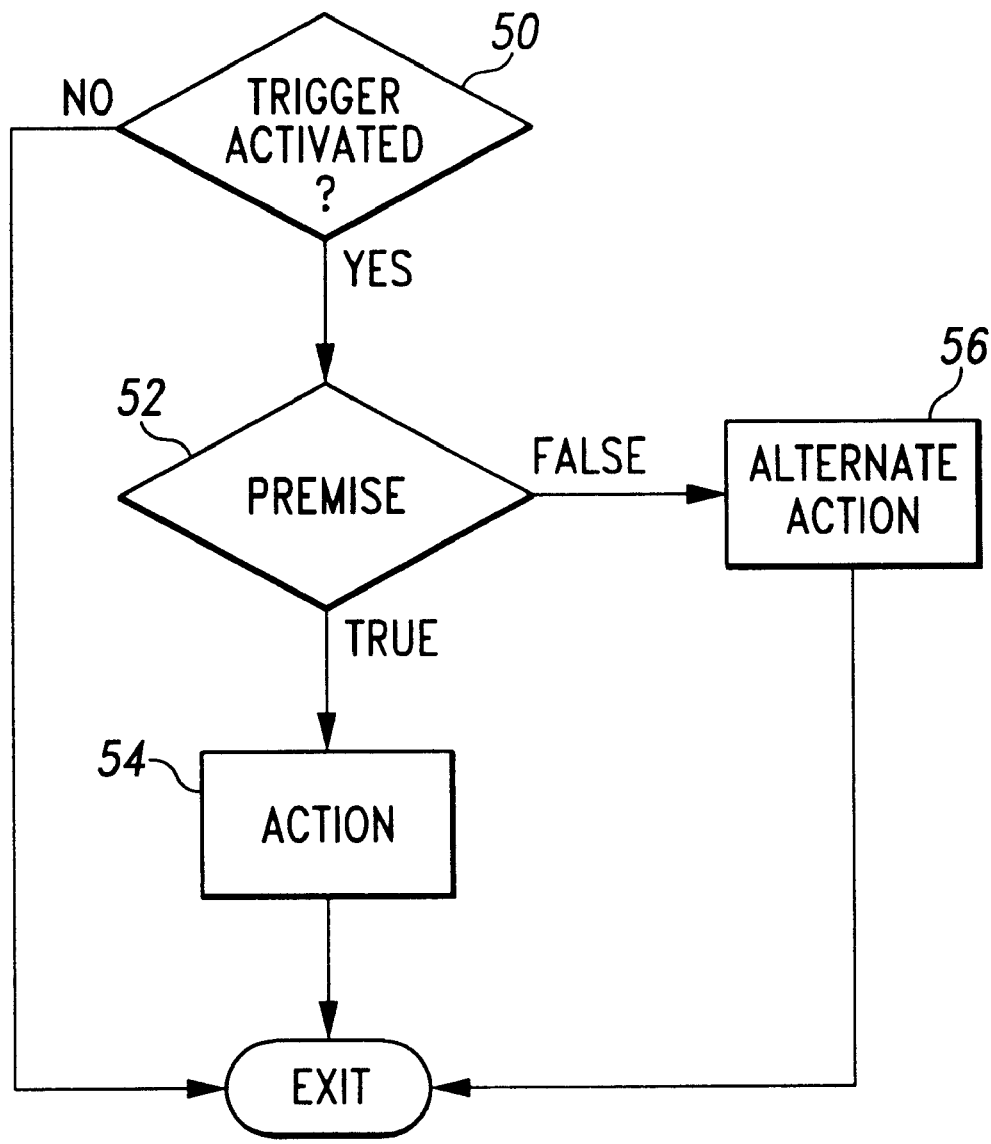
FIG. 6 is a schematic diagram of a rule of the present invention.

The rules will break down into triggers 50, premises 52, actions 54 and alternate actions 56. This is illustrated schematically in FIG. 6. The trigger or changes is whatever causes the rule to be evaluated. For automatic rules, the trigger will be the firing of a trigger in the database because a piece of data was accessed or a certain transaction is taking place. For rules that are part of a query, the changes will be the need for a piece of data that the rule computes (for instance the example score in the Change Textbook's Text Score object). Once we know that a rule should be evaluated, we see if we have enough information to evaluate the condition. Once we do, we evaluate the condition (also called a premise). If the condition holds true, the rule is fired, and the action is carried out. Sometimes, we need to do something (like maybe set a piece of data to zero) if the condition does not hold (it's a lot simpler than having two rules with diametric conditions). In this case, the alternate action (also known as the else action) will take place.

We need some way for the application developer and end-user to specify these trigger levels, conditions, actions and alternate actions. The trigger levels can normally be inferred by the engine, particularly in the case of queries. However, sometimes there is a need for explicit setting by the user; for example, the don't delete a student example would set a pre-trigger on the delete transaction. While premises are usually easy to state, in the form of if <something> (for instance, "if HCl Acid <20 l"), others are not so explicit. Both of the first two Academia examples lack an explicit if. Instead, they use a <something> must <something> syntax. The use of an if syntax would be much more cumbersome, for instance, "classes can only be added to the schedule if they are scheduled between 07:00 and 21:00 Monday to Friday or between 08:00 and 12:00 Saturday." The actions and alternate actions complicate this even more. In the traditional if <something> syntax, these two clauses expand it to if <something> then <something> else <something>. Again, our examples do not generally follow this flow. Many times the actions are implicit, for instance, if the premise for the add class rule holds true, we do nothing and let the class be scheduled. If the premise does not hold, the alternate action will cancel the transaction. The opposite takes place in the delete student example. If that premise holds true (the student is enrolled in classes), the action cancels the transaction and the alternate action does nothing. Of course, actions may be explicit, as in the accreditation rule for Change Textbook.

In order to specify the trigger levels, conditions, actions and alternate actions, we need some sort of language. So far, all of our examples have been stated in natural English. Many think that pure natural language would be ideal for stating rules, however it is not. Pure natural language is too ambiguous. Most application developers and system administrators would not trust a system that makes any assumptions. Perhaps someday, other technologies will allow systems to act properly in ambiguous situations. In the mean time, we need a language which is well defined. There are numerous properties of languages which we must consider when selecting a language. The language should be (in no particular order):

Standardized, so that it has a small learning curve, as people already know it, and we don't have to worry about it changing on us.

Marketable. Some languages appeal to DBAs, such as SQL, others are hot right now, like Java, still others may scare people away, like Common Lisp.

Able to access the data in the database. Whether this is a SQL Query, an ODBC/JDBC call, a call to our API, etc., a straightforward mechanism for this must exist.

Integrated. The language should have some concept of the database data types. Whether this concept is native or something we add onto it, it should be there.

Simple, end-user oriented. Since we want the end-user to be able to create and/or modify rules, the language must be simple enough for them to understand, and should not allow them to crash the dms (as poorly written C-code might).

DBA oriented. While we want to reduce the load of IS, they are still probably going to do the bulk of the work with the rules, hence it would be beneficial to have a language they are comfortable with.

Powerful. Although the language should be simple, it should still be powerful enough for the application programmer or advanced DBA to be able to create any conceivable rule with it.

Fuzzy. We would also like the language to understand fuzzy variables and fuzzy logic, as this is considered standard in inferencing engines. Again, this may be native or tacked onto the language by us.

Able to store temporary data in the form of variable storage, preferably broken into local and global variable spaces. Again, example score is a variable. Any data that needs to be stored across iterations of the engine (for instance state information) should be stored in the database where it is non-volatile.

Able to execute external actions. Even if it's something as simple as calling a CSP, the mechanism must be there, or a great deal of the usefulness of the system will be sacrificed.

Fast, particularly when evaluating premises. While we will only evaluate premises for data items that are relevant to that premise, some execution times will be unacceptable in most contexts. For instance, if we load an interpreter (such as the JRE) every time we go to evaluate a premise, our execution time will drop through the floor. At a minimum, an interpreted language should keep the interpreter running and call into it as needed. Ideally, we would use compiled code. As compilers are available for most languages, this should not be a big problem.

Dynamic. The user should be able to change the rules while the database is running. If we use a compiled language that requires us to take down the database to recompile and relink then users will lose many of the benefits of a business rules engine.

Interfaced to the database already.

Fast to develop rules with. This would be aided by the last requirement, but they don't correspond exactly, mostly because the designer will have to parse any language chosen. The simpler the language, the faster the development.

Debuggable. Either using a third party tool, such as that which comes with a standard development kit for the language, or through a custom debugger.

Another need that we have in the system is for that of user feedback. Specifically, so that a user can be prompted to provide additional information if the system needs it for further evaluation. For instance, in our Change Textbook object, the information on the availability of the textbook is not normally stored in the database, hence when the user queries the object, the object will have to query the user for information about availability (unless the accreditation rule fires). This creates a problem however: what happens if the rule is fired automatically and the user is not at their console (for instance, if a Change Textbook evaluation is done automatically every semester)? The probability is that other users will be locked out of the database until the dialog is cleared: it's an out-to-lunch problem. We would like two forms of feedback: interactive for explicit queries and non-interactive for all other operations. The non-interactive could be as simple as an error condition returned to the calling application specifying which piece of information is required. The rule-set could then either fire again from the beginning with the supplied data, or (preferably) pick up where it left off with the supplied data.

An alternative form of feedback is in that of rule correctness. This would require a fuzzy logic environment. Each rule would be assigned a certainty factor. If two rules both contribute to an answer, their contributions are each given at that rule's certainty. At some point (such as a goal), the answer with the highest certainty is chosen. When the answer is returned, the user evaluates its correctness. If it was correct, the rule whose answer was used (in whole or in part) is assigned a higher certainty, and the other rules are assigned a lower certainty. Alternatively, the user may want to change the result of one of the sub-goals in order to produce a more accurate final assessment. Again, this feedback mechanism would require both an interactive and non-interactive interface. The interactive interface would pop up on the users screen during execution prompting verification of the result of each sub-goal that is evaluated. A non-interactive interface would need to refer to store the results of each query session such that later, the engine can be told that the results for a particular session were correct or incorrect.

The Change Textbook object illustrates how the rule correctness mechanism could work very well (as well as its limitations). We would start with each rule assigning true or false with a certainty of 50%. Take the example where the text is hard to find and people have yet to touch moon dust, but the students love it and the Prof. wrote it. We would get a 75% certainty for true (from the hard to find and inaccurate rules), but a 75% certainty for false (because students loved it and the Prof. wrote it). The user is informed that no solution is available (due to a tie), but the user sends feedback that the answer is true, so the rules that fired true are increased to 75% certainty and the rules that fired false are decreased to 25% certainty. The change is weighted, so if either of the true rules is correct next time, it will have a certainty of 83%. However, if it is incorrect, then it will have a certainty of 50% (The weighing is center seeking which prevents it from ever becoming greater than 100 or less than 0). Our problem lies with the rule that assigns an answer based on the Student Feedback. We could either model that as 4 different rules (which is cumbersome, but probably the best approach), or as a rule such as "If the Student Feedback is greater than 3 then Change Textbook is false, else it's true." The problem with the single rule approach is that a rating of 4 or 5 would both assign false with the same certainty.

This is one application for neural networks in the present invention. We would place a neural network between the Student Feedback object and the goal. The network would be initialized such that a value of 1 in the Student Feedback returns true with 50% certainty and 5 returns false with 50% certainty. In the beginning this would give us a linear progression such that 2 and 4 would have 25% certainties for their respective values. This has the added advantage that other values can be evaluated, such as 4.5 which would be false with 38% certainty.

This illustrates another advantage of neural nets: as they handle continuous values, they affect the values around them to a slighter degree.

Our neural network has applications beyond "smart functionality" as we have shown here (where we put x into the "black-box" and get f(x) out where the neural net creates f). It should also recognize "similarity" such as if two pictures are similar. It should also have some mechanism of reporting what connections have been made inside the black-box so that it can report on previously unnoticed relations between the data.

Of increasing importance to the business rule community is the idea of a continuous business rules environment. Part of this is the dynamic nature of the system, which I addressed in the language consideration. Another part of this is the idea of incorporating temporal facts and versioning. Consider the case where the rule for stocking sulfuric acid changes to, "Stock four times as much sulfuric acid as HCl acid." This change is to take effect at the beginning of next year. We want to be able to schedule this rule to take effect as of midnight, January 1 and the old rule to stop working at the same time. These are the types of temporal facts we want to incorporate. One of the biggest considerations in implementing this would be the ability to test it. We would need to provide an environment to simulate firing the rule set after the new rule takes effect. Further, the user doesn't want two copies of a rule for the same thing lying around, so we should provide versioning. In this example, the old restocking rule could be version 1.0 and the new one would be version 1.1. All the system needs to do then at midnight is switch which version it's using. This provides the additional advantage that a rule-set could be fired as it would have in the past, perhaps to debug why a particular decision was made at that time. The chemistry department at a university using Academia discovered the most useful consequence of versioning: after implementing the new rule for stocking sulfuric acid, they started to discover that they had so much sulfuric acid on hand that it started going bad. Fortunately, this was easily fixed by reverting to the original version of the rule.

We must have a provision for debugging. There are two levels of debugging that we should support. The first is a how and why mechanism so that after a consultation, a user can query how or why a result was reached. The second is an interactive debugger that allows the user to step through the rules, possibly changing decisions made along the way (as per one form of feedback). We should be able to step in reverse as well. That would allow us to debug a rule set after consultation, perhaps if the why explanation is insufficient to find the problem in the logic.

To generalize many of the requirements, we need an integrated development environment (IDE). This IDE can run from any client workstation and will connect to the database, giving us the permissions of the person running the IDE. Through the IDE the user can lookup, modify and create rules. They can also create maps, do consultations for decision support, give feedback on the accuracy of the rules and objects and debug the rules and objects. Essentially, it is a tool which allows us to do everything that a user would want to with the rules system of the present invention. The IDE will be built as a separate application on top of a feature rich API, which an application developer may use to integrate any aspects of rules at they need into their program.

Implementation

The implementation consists of three parts: the IDE, a compiler, and an inference engine with neural network. The compiler, and inference engine with neural network all reside on the server. They make their services available through a high level API which is available through the network layer. The IDE is a graphical interface to all of the functionality which the API provides. The IDE runs on any client and will communicate with the other components exclusively through the API.

The IDE

The IDE exists as a complete environment for developing rules and business objects. It can be offered in three varieties: a graphics-intensive display where rules elements are represented by rendered objects, a normal windowing display where elements are represented by 2D objects, or a text interface.

When maximized, the rendered GUI's title bar and menu bar is hidden and all other erroneous windows elements (like window edges) will be discarded. The rules, goals and other elements can be easily represented as rendered objects, much like those used in the Academia example visualizations.

As an alternative embodiment, a normal windowing display can be sued for lower power computers. This interface acts as a normal windowing GUI and directly replaces the rendered objects with static, 2D objects. In fact, the same code is used underneath both systems to handle the placement of objects and events such as mouse-clicks. Either a RenderedGUI object or a WindowingGUI object is passed to it in order to do the final display. It is possible for the user to change between the two while the IDE is running.

The final alternative embodiment interface is a simple, text-based interface. This interface is very simplistic as it is for users who either are blind, and hence require an interface compatible with a synthesizer, or who need to administer the system remotely from a location where bandwidth or firewalls prevent use of anything other than a text interface.

The IDE focuses on the concept of business objects. On startup, the IDE displays all of the business objects (that it is possible to display) in the database, lining them up horizontally across the screen. Components can be left-clicked and dragged to a new position in the rule space. Components may be referenced multiple times (i.e. numerous rules may use a particular variable). Components will be "declared" in one place in the rule space, where it will appear normally. In any other place that it is used, it will be "referenced", so it will appear faded; when right-clicked, one option will be to locate where the component is declared. Components which contain nested components underneath them (such as goals) will only have the nested components expanded from the declaration, not from a reference. This demonstrates that more than one object may encapsulate the same nested object as another does. This is a violation of the prior art concept of object encapsulation, but support for object reuse. This issue illustrates that our business objects are not true objects, particularly as they are not derived from classes. Any component can be double left-clicked for a pop-up dialog with all the settings for that component, for instance the name, inference method, and automaticy settings for a goal or the priority, text, and cost of a rule. Left-clicking on the background acts as a grab tool which allows the user to drag the background underneath their window. Should this method prove to be inadequate to the user for maneuvering the rule space, there is also a small toolbox which includes a navigation tool as well as buttons to zoom in and out. The toolbox also contains a button to return to the top-center should the user get lost among all the rules. The user cannot scroll more than 100 pixels past the most extreme element on a side. Right-clicking on the background brings up a pop-up menu through which additional components can be added.

Right clicking on the background also gives a Properties . . . option. The properties dialog contains the access codes for the rule space. It also contains a current date/time setting. This setting dictates the date/time that the system emulates when one is running in evaluation mode. This time may be in either the past or the future. There is a button next to the time setting to reset it to current time. There are also three flags: evaluation, use recent versions and specify version. The evaluation flag runs the inference engine in evaluation mode without pausing on any particular component. The use recent versions by itself will use the most recent version of a rule (which has a start date/time before the specified one and an end date/time after it) during engine execution. The specify version flag will display a list of versions for a component that are possible given the current date/time setting when that component is used in an evaluation. (Note that only one numbered version is possible, but numerous recent versions may be possible as they are allowed to have overlapping settings.)

Debugging

Figure 7:
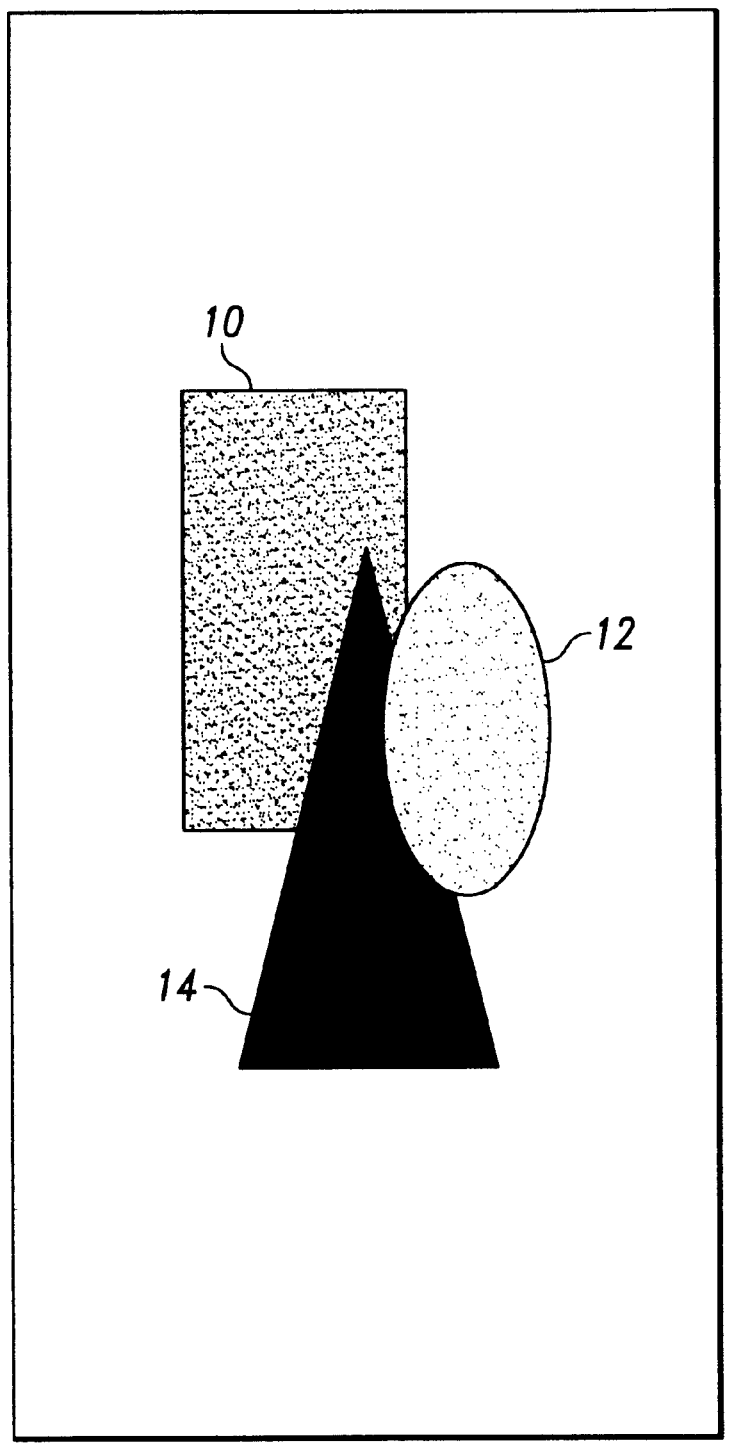
FIG. 7 is a schematic diagram of a basic business object of the present invention.

The user can set a breakpoint on any component. Breakpoints should normally be used while the engine is running in evaluation mode. Evaluation mode is used to step through the execution of a rule or object for the purpose of debugging or verifying the results and providing incremental feedback. While in evaluation mode, a copy of the data is used such that the original data does not get modified. The IDE will visually illustrate where the execution of the engine is. Normally, a basic business object with goals, rules and data will look like the displays illustrated in FIGS. 2 and 3. In an alternative embodiment, the business object may be less elaborately illustrated as shown in FIG. 7.

The IDE greatly simplifies debugging by use of an active graphical user interface (GUI) that displays the portions of the business object being executed and their interconnections. As execution proceeds through the business object, that portion of the display is changed, such as by illumination (such as a glow), color change, shading change, etc., thereby instantly indicating to the user where the execution is proceeding.

In the preferred embodiment, the engine will then pause the next time the flagged rule or a rule within the flagged object is evaluated. The data used in the evaluation of the rule will glow in the display.

At this point the user can look at the value of that data as well as the rule itself. They have the option of stepping into the premise, stepping over the premise, or skipping the premise. This is important to differentiate. In procedural programming, it is not logical to skip the execution of a statement, as each statement leads to the next (it's a very linear and limited way to think). But in rule based programming, we can say that a rule should just be skipped, which means that another rule or rules must be used to find the value that we are looking for. For instance, in the Change Textbook example, perhaps we want to evaluate if a textbook should be changed without regarding its availability (perhaps because copies will be issued to the students). In that case, we could set the evaluation flag on the availability rule and when we pause on it, elect to skip it. Should we not skip it, then either the premise will be false, in which case we proceed to the next rule, or the premise will be true, in which case we fire the rule.

Again, we can step into, over or skip the firing of the rule. Finally, we will reach the goal.

Here the user will be able to validate the result, either for the purpose of feedback, which will be used in future consultations, or for feed forward, should the goal be a sub-goal of a larger object.

Components

The following components can be added to the rule space:

Rules

Goals

Variables

Sets

Sorting rules

Value maps

Neural nets

These components are limited in the following way:

Rules must originate and end at a goal, variable or set. Note: The start and end may be the same, as would be in the case where a rule is acting as a constraint for a set of data.

Goals and Variables may be assigned by rules or a member of a set.

Sets are the same as sets in the database. They may be actual sets from the database or temporary sets created when first needed by the inference engine and destroyed at completion.

Sorting rules are attached to sets. They sort a set by the specified criteria whenever a member of the set is modified by setting a trigger on modifications to records in the set. If triggers are not available, the set is sorted whenever the inference engine retrieves a record from it.

Value maps are attached to sorting rules. The same value map may be attached to multiple sorting rules.

Neural nets are attached to either a sorting rule or set, or they take the place of a rule. They are attached to a sorting rule when they are being used for evaluating the similarity between objects and evaluating which one is closer to the desired objective. They are attached directly to sets when they are being used for relationship discovery. They take the place of a rule where a variable or goal is set based on the learned behavior and inputs. The setting of Change Textbook by Text Score using a neural net is an example of this. As value maps, they may be attached to multiple objects, but only in the same context (always attached to sorting rules or always attached to sets).

Every component has different options in its configuration dialog as follows:

Rules: a name, the rule itself, priority, version options, start and end date/time, and a flag for computability. (The computability flag is turned off if the rule is for human reference only; the rule is then not compiled.) Under advanced options: A comment, order (within a priority level), cap (maximum number of times fired per consultation), certainty, cost, short-circuit flag and the rule's designation.

Goal: a unique name, start and end date/time and version options. Under advanced options: limit for the number of values, rigor for finding, chaining status, aliases (e.g. as Text Score <-> Student Feedback) and access code.

Variables: a name, source (in the database, temporary store, CSP or prompt) with priority, valid values for prompting with a multi-value list box, start and end date/time, aliases and version options. Under advanced options: limit for the number of values, rigor for finding, chaining status and the variable's designation. The priority for a variable's source determines how a variable will retrieve its source. The highest priority source is tried first. If the value cannot be ascertained that way (for instance if the field is empty in the database or no rules fire to set it), the next level down is tried. If a source has a priority of zero, it is not tried. If all sources with any priority are tried and a value cannot be found, then the variable is treated as unknown.

Sets: a unique name. If this name matches a set name in that database, its TDDL definition is used and only version options and a copy flag are displayed. If the copy flag is selected, then the present invention works on a copy of the data (useful if you want the present invention to sort the data, but you don't want the original record order disturbed); in order to apply a sort rule to a set that is stored in sorted order, the copy flag must be selected. If the name does not match an existing name, the options are source (a list of sets which are merged to create this set), include (a list for including variables or goals), start and end date/time and version options. Under advanced options: locking options (none, write or exclusive), title, access code and a temporary flag.

Sorting rules: a name, list of all common data item types, start and end date/time options, and version options. Under advanced options: The rule's designation. The list is the key item. It lists all data item types which are common to all records in the set to which the rule is attached. Beneath each data item type is a goal value. Below the goal value is a configure button. At the bottom is a priority setting for that data item type. It can be set from 0 to 10. By default, items with no goal have a priority of zero (as it doesn't matter what they have) and items with a goal have a priority of 5. The higher the priority is, the more importance that will be placed on that goal being met. The priority is totally relative, so all goals having a setting of 5 is the same as if all goals had a setting of 10. The goal is the value that we want the record to be closest to. The goal can be abstract like maximize (useful for fields such as return) or minimize (useful for cost). The configure button allows users to configure their fuzzy settings, add or modify a value map, or work with a neural network. Configuring the fuzzy settings uses the same editor as a value map, except that the values run continuously between points, so while one may only see points for 100 and 200 on there, the location of 150 is there and may be inferred by the location of the other two. If a value map or neural net is selected and one is not already attached to a data item, then the user is presented with a list of available value maps or neural nets, or the choice of creating a new one. If an existing one is selected, it is linked to that data item. If a new one is selected, the value map editor or neural net editor is brought up. Finally, if either a neural net or value map is already attached to an item, choosing such will bring up the editor with that item in it.

Value maps: a unique name, start and end date/time, and version options. The main part of the window is a map with concentric blue rings (dark at the center, light at the edge) centering on the goal. The relative location of every value is denoted with a labeled black dot. There is a box of unused values on the edge of the map. Each value may be dragged from one location to another on the map, or into or out of the unused values box. There are also plus and minus buttons below the unused values box which control how large an area the concentric rings cover. The color density of the ring which a value is located on indicates the certainty which will be applied to that value in the calculation. As the goal is at the center (which is the darkest), it has 100% certainty. Any values which lay beyond the rings on just the white background will have a certainty of 0%. The only thing one can do when using the value map editor for configuring the fuzzy settings for a range is increase or decrease the size of the rings.

Neural networks: a unique name, network connections (i.e. 10-70-5, meaning 10 neurons feeding 70 neurons which feed 5 neurons) excluding the input and output layers, start and end date/time, and version options. If the net is attached to a sorting rule, a learning button is also displayed. If the net is attached to a set for analysis, an analyze button is displayed. If the net is to act as a rule and output to a set (A filtering neural network), a learning button is displayed. Otherwise, the net is to act as a rule but is not outputting to a set (a plain rule neural network); it has a learning button which brings up a dialog which prompts the user for the name of a set to get its learning information from. Given that set the user must pick the data items for the source. The final field is to indicate how many times the net should learn from this sample data. The analyze button brings up a dialog which displays all the data item types in the set. With this, the user can enter goals for some of the fields (including things like maximize or minimize). Hitting the predict button will display predicted values for the other fields. As an example, let's say that we have all the stock information for every day for the last 10 years. If we attach a neural net to it and analyze it, putting in IBM and tomorrow's date, it will predict what the high, low and close values for IBM's stock will be tomorrow.

Each of the component dialogs also has the standard controls "OK" (or "Submit") and "Cancel". Hitting the Cancel button simply discards any changes and closes the dialog. Hitting the OK or Submit button sends all the information on that component to the compiler. The compiler will try to either add a new component or add a new version to an existing one. If it is successful, the window closes. If it is not successful, the user is prompted to either stay and change what was incorrect, or save the component anyway. If the user chooses to save anyway, the component is stored as-is and a flag is set internally which prevents it from being used in consultations.

Note that goals, value maps and neural nets must have unique names as they are addressed on a top-level. Rules and variables do not need to have unique names; however, their names must be unique within their business objects. They all have designations which are unique. These designations are created through a combination of the rule or variable name with the goal name or set name. Rules and variables which are not part of a business object must have unique names (they may all be considered part of one big system object). We allow non-uniqueness between names because the rule space could conceivably contain millions of rules. In such a case, names would become either unmanageably long and/or meaningless. This way, the designations end up being humanly, unmanageably long, but users can still identify their rules and variables.

All components have version controls. The version controls display the current version number and provide buttons to add a version, increment or decrement the current version. A detailed description of versioning may be found under the compiler section.

Each component under advanced options has a delete button. A component may only be deleted if no components depend on it, either in terms of needing or changing, or if a flag for recursive delete is set. In either case, confirmation is requested and if recursive delete is chosen, a second confirmation is requested. A recursive delete will delete a component and all components that depend on that component and all components that depend on those, and so on. In the case of deleting a goal, most of the rule space may be eliminated. It should be stressed that deleting is not recommended. Instead of deleting, we suggest that the component's active date/times be set such that it will no longer be active. Deleting should be used for the sole purpose of reclaiming space in the database that was being used by an experimental or ill-conceived component or object.

Right-clicking on a component brings up a pop-up menu with its basic actions, such as Edit or toggling the breakpoint flag. Goals will have an option to consult for them on the menu. Neural nets will have either a learning or analysis option depending on how the net is configured.

The Compiler

The compiler handles all the aspects of maintenance of the business objects and their rules. On the most basic level, when a rule is submitted for addition or modification to the rule set, the compiler will compile the English-like syntax and store both the original and the compiled byte-code in the database. The compiler will also handle the user-defined maps. Likewise, it will process and store all information on components such as goals, variables, sorting rules and value maps. A value map will just be a list of items, their respective coordinates, the goal (such as <null> in the scholarship example), and a list of distances from the goal for which the different levels of preference decrease to the next level down. With sets, the compiler will store all configurable information, and in the case of new sets, it will create the new set (with the extendable schema calls). With neural networks, it will process and store the configuration information. It will not modify the network itself. For all components, it will verify that the user has sufficient access privileges to add or change the given component.

The compiler has two sets of APIs which handle most of the operations of the compiler. One set has a call to add or update each type of component into the rule space. The other set is for retrieving components from the rule space. If the component is a rule, then the rule itself is compiled using a parser generated with ANTLR. The parser will break up the rule into its component parts: the premise, action, alternate action and triggers. Each of these will be stored in the database as a data item for the given rule. The first three items are used in the examination of a rule, just as these items are used in a standard chaining inference engine. The compiler will also identify and set the needs and changes for the rule (which are not stored with the rule, rather they are stored as links in the database). The needs will be a set of goals, variables and sets which are needed before the premise can be evaluated. The changes will likewise be a set of goals, variables and sets which the rule changes upon firing. The premise will be a simple byte-code which the inference engine may evaluate once the needs are fulfilled. The action will likewise be a simple byte-code which will be executed upon positive evaluation of the premise. Likewise, the alternate action is a simple byte-code which will be executed upon negative evaluation of the premise. The compiler will determine any dependencies on an event (such as modification of data or creation of a record), and then set a trigger on that event. The triggers that are set are stored with the rule, so that if the rule is deleted, they are too, or if recompilation changes the necessary triggers, only the new triggers are added and only outdated triggers deleted. Both the byte-codes and the original text (for future editing purposes) will be stored in the database.

Versioning

Only one version of a component may be active at any one point in time. This may seem obvious, but it must be stated as it has some great ramifications on the present invention. Specifically, if we make a change to a component, when does that change go into effect? There are many times that we don't want that change to go into effect immediately. For example we may change our components to model a change in policy that goes into effect at a certain time or we may make numerous changes to the system and we want all of the changes to go into effect simultaneously. For this we provide versioning with start and end times.

Any component may be either a numbered version or a recent version. Anytime anything other than the start or end date/time of a component is changed, a new version is assigned. Recent versions are every change that has been made to the component since it was last assigned a version number. These changes are kept in a list starting at the numbered version extending to the most recent version (this is actually not that inefficient, as will be explained in a moment). If only the start and/or end date/time has changed, then we must verify that the new values are valid. All times that a component has been (in the past) or should be (in the future) active are stored in a list with that component so that the state of the system at any time may be evaluated. To begin, if either the start time or the end time is blank, then the times are invalid. If both are blank, then the rule is disabled. Given that, we verify that the start date/time is valid. The time structure will have an option to indicate current time that would be valid here. If both the new start date/time and the current date/time fall between the previous start and end date/time of the version, then the previous start date/time of the version is used and the start date/time is considered correct. Otherwise, the start date/time must be equal to or greater than the current date/time. (This basically says that we cannot change the past.) The time structure will also have a field for infinity which may be used here (as well as current time). The end date/time must be greater than or equal to the current date/time. Given these conditions, we know that the start and end date/time are possible. Now we must verify that the times do not overlap with any other versions. We scan through all numbered versions of the component using a depth first search (which will make sense as soon as the numbering scheme is explained) starting at version 1.0. For each time stored in each numbered version (except the one we are evaluating), we verify that our new start and end date/time are either both less than or equal to its start time, or greater than or equal to its end time. While this may be an expensive operation if the component has a long, varied history, it should only happen rarely. If an overlap is detected, the user is shown the conflicting versions and may either correct the overlap manually or may select automatic resolution. If automatic resolution is selected, then any conflicting component that should be active at the start date/time of our new time has its end date/time set to our new start date/time (even if its end date/time was after our new end time). Any component whose times fall entirely within our new one has its times removed. Finally, any component that starts during our proposed time period and ends after it has its start date/time set to our new end date/time.

Recent versions are allowed to have overlapping start and end times, as they are only used for evaluation and testing purposes. Only numbered versions are used by the inference engine for a normal consultation, as will be explained in the inference engine section. The add version button only works on recent versions. When it is hit, we attempt to add the active component (the one which is displayed in the user's dialog box) as a new numbered version. In order to be a numbered version, the component must compile properly. We evaluate the start and end date/time of the submitted rule as we do above, with the additional condition that the date/times of the new version must not conflict with the old version. If the active component is accepted, all recent versions of the component except for the active one are removed, the active component is assigned a new version number, and linked directly to the last numbered version. If someone else is editing the same component, then the numbered version is added, but the recent versions are not deleted. If that other user proceeds to add a version, the recent versions are then deleted and the new version will be assigned a number as described next.

If the numbered version which the active component is derived from is the highest numbered version, then the user is prompted to determine if they want to increment the major or minor version number. For instance, if the active component was derived directly from version 1.1 of the component, incrementing the major version number would make the new version 2.0. Incrementing the minor version number would make the new version 1.2. If the root of the derivation is not the highest version, then the lowest minor version (that does not have a version above it) is incremented. For instance if there are three versions of a component: 1.0, 1.1 and 2.0 and you make modifications to version 1.1 of the component, then the new component is 1.2. If that version exists, a new .1 minor version is added. For instance, if you modified the 1.0 version in the last example, then you could not add 1.1 as that already existed, so the new version would be 1.0.1. If you then modified that version, the new version would be 1.0.2 and so on.

Unlike some versioning systems, the version of a component is solely a function of that component and its changes. Changing other components that are attached to that component (such as changing a rule which defines a goal), does not affect the version of that component. The version of the other component that that component is linked to is determined purely by the date/time the execution takes place in. The current versions of all components are linked together to speed execution. Both the compiler and the inference engine update these links as needed (whenever either finds a stale link, it fixes the link). The compiler maintains a network of connections to all version 1.0s of components such that none are orphaned by being disabled.

While other versioning systems rely on deltas to store differences between the versions, the present invention stores the entire component. This is because the present invention is designed specifically for rules which are normally very small, hence a delta between two versions of a rule could easily take up more space than just storing the new version. This also spares the expense of maintaining forward or backward deltas and creating a copy of a specific version when it is needed.

Recent versions can only be used in evaluation mode. While it will not pause on the rule or goal unless the breakpoint flag is explicitly set, it can only be used in interactive mode (that is, no triggers will be set or use it) and will not work on the original data. This allows normal users to continue to use the database with stable rules until the new rules are brought on-line.

Rule Storage and Export/import Mechanism

The rule space is stored in the database directly, as the components and their possible definitions closely resemble a navigational database. There are sets containing all the instances of a particular component to allow for easy searching. For instance, when a new rule is added, the set of variables can be searched to find the elements in the rule's wants list. The rule will then be connected to its wants. This means that the inference engine can easily navigate through the rule space at run time in order to achieve maximum performance.

This has the added advantage that the rules will be directly tied to the data. If the data is moved to a different server, the rules move with it. This creates a problem for application developers who want to create rules to ship with their application: they can't ship just the portion of the database with the rules in it and they can't ship a database already initialized for a Terabyte! Therefore, we provide a mechanism to export just the rule-space into a file and then import that file back into a database. This allows application developers to develop the rules they want to ship with the application, export those rules and their associated components to a file and ship it to their customer. Then, after the customer initializes their database, the file can be imported into the database, and the rules are in place.

Another benefit of storage of components in a navigational database is that name changes will propagate automatically. For example, we may have a rule which states "Cost of item is the sum of component 1 and component 2 times Phase of the moon certainty 20" to help determine the goal Cost of item. If we change the name of the goal to Total cost of item, then the rule will be automatically changed to "Total cost of item is the sum of component 1 and component 2 times Phase of the moon certainty 20". It should be noted that this change propagates through everything, even previous versions of the component and the components which depend on it, and is not a change which causes a version change. This is because the name is how we identify a component, so if we change its identifier and then try to find it using a previous name, we won't find it. This could be prevented by using separate names and designations for every component, but that would get too confusing for the user. It should be further noted that changing the name of a rule or variable changes its designation as well.

Language

The input to the parser will be a simple phrase (as a string). The parser will generate three associated byte-codes for the premise, action and alternate action. The premise will contain the code for a logical expression to evaluate the premise. The action will contain a list of expressions to execute if the premise is true. The alternate action will contain a list of expressions to execute if the premise is false.

First, we will examine some allowable statements in our grammar and their ramifications:

Applicants must have secondary diploma date before applicants start classes.

This rule refers to the set of students records called applicants (once they are admitted, they will be put into the pre-frosh set). The present invention recognizes that applicants is a set. The phrase "must have" refers to any record being added to the applicant set. "secondary diploma date" and "they start classes" are data item types in the student record (if applicants had more than student records in it, all would need these fields). Both are recognized as record types by their position in this specific type of statement. "secondary diploma date" maps to secondary_diploma_date in the database and "they start classes" is translated to start_classes_on. These translations are accomplished as follows:

1. Try to match it verbatim with the name of whatever object should be in its place. So in the run command, we try to match it verbatim with all available functions. In some places, we may need to compare it against the names of all variables, goals and data item types.
2. See if a definition exists for it in our dictionary already, if so, use it.
3. If the identifier has spaces, repeat 1 but generate a list of all possible entities based on the previously mentioned translation. If the list only has one entry, ask the user if that is correct. If so, use it and add the translation into the dictionary. If there is more than one item, ask the user to select which one it is (or none). If one is selected, use it and add the translation to the dictionary.
4. Repeat 1, but use the available synonyms and titles for the entities instead of the names. Generate a list of all possibilities and resolve as in 3.
5. Repeat 3, but instead of translating spaces, look for all common spelling errors (letter omitted, letter added, letters transposed).
6. Repeat 3, but instead of looking for spelling errors in just the names, look at the synonyms and titles as well.
7. Give up: ask the user for a definition. If this definition is a new goal, variable or set, create it. Otherwise, it was either a mistake which the user fixes or the user provides a translation. If the translation (which may indicate that the string is either a type or function from the database, or may be a literal) is valid, store it in the dictionary.

Here's another example from Academia:

Classes must have start time after 7:00am Monday through Friday or after 8:00am Saturday, and end time before 9:00pm Monday through Friday, or before 12:00pm Saturday.

This statement is essentially the same as the last (they both impose a constraint on records added to a particular set), only it has a more complex premise. Note that, unlike in most NLP-like parsers, the comma is significant. It denotes the two parts to the and statement immediately surrounding it. Further, the logical evaluations here are distributed; this is best illustrated with pseudo-C:

(Classes.start_time>(07:00 (Monday–Friday)||08:00 Saturday))&&Classes.end time . . .

When we distribute the >, the 07:00 and the Monday–Friday, we have:

((Classes.start_time>07:00 Monday)||(Classes.start_time>07:00 Tuesday)|| . . . ||(Class.start_time>07:00 Friday)||(Classes.start_time>08:00 Saturday)) &&Classes.end_time . . .

Now we will look at rules which make up a larger business object:

Acid stock is good if HF acid stock is good, HCl acid stock is good, and Sulfuric acid stock is good, otherwise, acid stock is bad.

HF acid stock is good if HF acid stock level is >5, otherwise, HF acid stock is bad.

HCl acid stock is good if HCl acid stock level is >20, otherwise, HCl acid stock is bad.

Sulfuric acid stock is good if sulfuric acid stock is >HCl acid stock level*2, otherwise Sulfuric acid stock is bad.

Of particular interest in this example is:

1. The database fields may be called HF AcidStock, hence, when we first encounter "HF acid stock", we suggest that the two may be equivalent (it's a reasonable assumption), to which the user must tell us that the "HF acid stock" is a new variable. Later when we get "HF acid stock level", the user will indicate that this is what actually maps to HF AcidStock in the database.
2. The rule is specified using traditional mathematical symbols such as '>' and '*'. While the user could use more verbose terminology such as "greater than", and "times" or "multiplied by", using the symbols is perfectly legal as well and aids in the readability of the rule.
3. In the otherwise part of the rule, the goal/variable is restated. While it may be more natural to say "it" here, that will most likely complicate parsing.

For a larger system, we consider the Change Textbook example. We begin with the rules that define Text Score:

Text score is 30% readability score+30% example score+40% appropriate score.

For each value of readable, readability score is value certainty (count of readable=value)/total count of readable.

For each value of example, example score is value certainty (count of example=value)/total count of example.

For each value of appropriate, appropriate score is value certainty (count of appropriate=value)/total count of appropriate.

This is fairly complex, to the point that English alone isn't enough to describe the rule: we must use parenthesis to disambiguate that we want the count of records where readable=value and not where they=value/total count. "Value" in traditional programming terms, is a special loop control variable. In actuality, it is a keyword (what makes it special). "Count of" is an operation that counts the number of records in the database that match the specified criteria. We flesh out the rest of the Change Textbook example:

If accreditation board requires change is true, then Change textbook is true.

If textbook out of print and hard to find, then change textbook is true cf 75% else if out of print, then change textbook is true cf 25%.

If textbook inaccurate, then change textbook is true cf 75%.

If the best text score is 1, then change textbook is true cf 50%.

If the best text score is 2, then change textbook is true cf 25%.

If the best text score is 4, then change textbook is false cf 25%.

If the best text score is 5, then change textbook is false cf 50%.

For every $1000 in incentive, change textbook is true cf 10%.

If author is in faculty, then change textbook is false cf 10%.

Certainly, there are many points this raises:

1. The "is" operator adds a fuzzy value to the variable if a certainty factor is specified. Other values are not lost.
2. A certainty factor can be denoted either with the keyword "certainty" or just "cf".

3. We must say "textbook out of print" and "textbook inaccurate" because if we put an "is" in there, the system will test the variables "textbook", and "out of print" or "inaccurate" for equality.
4. "For every" divides the given data (incentive) by the specified amount (the $ is ignored: until T has tighter support for units, we will ignore them as well), and loops that number of times (the remainder is ignored).
5. The final rule demonstrates the "is in" operation, which searches for a record or item type in the given set.

A rule that a professor might enter for himself is:

Classes where Dr. Alhoph is teacher must have start time after noon.

This is a close variant to the first rule we considered, only this time the set, Classes, is narrowed to the records fulfilling the SQLish where clause. This shows why SQL was considered for the language; however, a complete SQL statement for this rule would be too complicated for even a professor or business analyst and it would also be too limiting to be able to assert that the selected classes must start after noon. Therefore, we take the best parts of SQL (the idea of a where clause) and create a grammar more appropriate for our purposes.

Here are a couple rules to define candidates for the John Flash Award:

Candidates must be in Sophomores.

Candidates must not have been hit by car.

The first rule filters out all records from candidates that do not also appear in the sophomores set. The second rule is a variation on the "must have" clause; this time, it's just the logical negation of that.

Some rules imposed by the accounting office are:

If a student's bill is greater than $10,000, then library privileges is false.

There are two important points about the first example:
1. The 's on student is used to denote that we are referring to the bill field of a student record.
2. The amount 10,000 is read in as 10000. We recognize the American standard way of denoting numbers: using a comma as an optional thousands separator and a dot as the decimal point.

Finally, we consider the rule that previously seemed daunting:

Only delete student if student has no current classes.

The "only delete" clause puts a pre-trigger on delete transactions. When executed, we check that the student record in question is not an owner or member in the m:n set "current classes" (the relationship could be modeled either way, so we must check for both ownership and membership). It has been observed that this will require a properly constructed schema, as the rule could fail if the student is listed as being in a class, but there is not a link between that class and the student record. We do not attempt to search all classes looking for this student.

These examples give a good outline for developing a specific grammar. Now we will consider other details about this grammar that were not expressed in the above examples. We will accept any placement of mathematical operators. For example:

5+5

5 plus 5

5 added to 5 add 5 and 5

5 and 5 added

All mean the same thing. The first 3 all represent an in-fix notation. The fourth represents a pre-fix notation and the last represents a post-fix notation. Note that the tense of the verb add is important here. In the fourth example, the future tense denotes that it is a pre-fix operator. In the fifth example, the past tense denotes that it's a post-fix operator. The third example also uses the past tense of add, but as "to" immediately follows it, we know it's an infix operator.

A major advantage of using pre and post-fix notation is that we are not limited to operators being binary: they can now act on lists of numbers. For example:

2+3+2+3 add 2, 3, 2 and 3

2, 3, 2 and 3 added

All mean the same thing. Our list of operands is formed as a comma separated list, and the last operand is denoted with the word "and".

Inference Engine

The core of the present invention is the inference engine. The engine should be relatively simple. There are two ways it can be started: being told to evaluate an individual rule (like a constraint verification; usually called by a trigger), or being told to evaluate for a goal. When it starts, it assigns a session ID (unique integer or handle) to that session. It also records the current time. That time is used for the remainder of the session. This allows a decision support system to begin at 23:59:59 one night, and not have to worry about becoming non-deterministic at Midnight if any rules change then.

The basic way that the engine works is that it takes a goal and sees what rules must be evaluated to calculate this goal. It proceeds to try those rules. (Skip right to here if it was invoked for a specific rule.) For each rule that it tries, it starts by making sure that it has all the data that it needs; if it doesn't, it looks at that data and tries to set it. If it does have what it needs, then it evaluates the premise of the rule. If the premise is true, then the rule fires, otherwise we continue on to the next rule. The order in which the rules fire and how many fire before we decide that we have found the goal is determined by the rule priority and order, and goal settings. The call to the engine returns with an error status indicating successful completion, unable to complete or more information needed.

If the call was successful, then the result (if any) may be retrieved. The result may be of any type. If the engine indicated that it needs more information, then a call to the engine retrieves the prompt for the information needed, type of the information, and possible values. Once that information has been obtained, it can be passed back to the engine. Another call restarts the database where it left off. This is where the session ID is useful. It is what the program passes to the engine to indicate which session to resume. This allows numerous copies of the program or several different programs to pause and resume the engine as needed. The engine maintains a history of all sessions. This history is used both for consultations while obtaining additional data, for debugging sessions after a breakpoint has been hit, and for reasoning (how and why) after the consultation. The size of this history is configurable, but defaults to 5 sessions per user. If a 6th session is started, then the oldest session is dropped (we presume that the user no longer needs that information).

A session can be started without evaluating a goal or rule. This is useful for setting variables before starting (rather than waiting for the engine to prompt for them), or for starting a debugging session. For debugging sessions, the engine is set to evaluation mode and breakpoints can be set on different components. In debugging sessions operations are only performed on a copy of the data. This essentially means that all database operations are performed as transactions which are eventually cancelled. Breakpoints can be set in non-debugging sessions as well. This allows the user to track the logic of the engine and validate its results.

Neural network

We have three different types of neural nets, each with a distinct purpose. They are all initialized and updated through the compiler. The compiler calls the neural network module for training. The training API call may be made directly. This is most useful for incremental or interactive learning from applications. At run time, the neural nets are called by three different API calls, one for each type of network:

Nets acting in a data mining capacity are called with a template record with which they fill in any blank fields. They may also be queried for free form information, in which they report any related fields, how they are related (e.g. direct, exponential, inverse, etc . . . ) and how closely related they are. Note that this is not done through statistical calculation of the data, but rather through statistical calculation of the projected results. Say we provide the following set for analysis:

The rule engine contains an inference engine for evaluating and executing groups of rules (rulesets). The rulesets are stored either in the database 13 (preferred embodiment) or externally 21, and are loaded by the rule engine 8 into memory 11. The rules in the ruleset are then evaluated and executed, using either functions built into the rule engine 9 or using arbitrary user-written external functions 23. From the client and database server, the combination of the rule engine, ruleset in memory, built-in and external functions (grouping of 8, 9, 11 and 23) may be viewed as a single stored procedure.

The ruleset may be invoked directly by the client (explicit invocation, 15) or indirectly via a trigger (implicit invocation, 25). In the implicit invocation, a client request to the database server causes a change to the data in the database 27. A trigger associated with that data change causes the sever to execute a ruleset via the rule engine.

A particularly important aspect of this invention is that the rules can be enforced for all models of database access. In the preferred embodiment rulesets implemented as triggers and stored procedures can be embedded within the engine in a model-independent manner and executed no matter what

| Jan. 5, 1998 | Jan. 6, 1998 | Jan. 7, 1998 | Jan. 8, 1998 | Jan. 9, 1998 | Jan. 12, 1998 | Jan. 13, 1998 | Jan. 14, 1998 |
|---|---|---|---|---|---|---|---|
| 35.6 | 36.4 | 37.7 | 38.5 | 39.7 | 41.0 | 42.5 | 44.5 |

This amount of data alone is insufficient for a net to analyze, but it serves for this example. A statistical analysis might show a slowing increasing curved growth. A neural net analysis might instead show the start of exponential growth. The neural net determines this through the use of statistical analysis on elements projected before and after the given data. This information could be very lucrative if the data represents a financial object, such as a stock or future. If that were the case, the majority of the training data would come from other stocks or futures. Sometimes we will detect patterns which can not be described in statistical terms.

Nets acting as value maps will simply return a certainty factor when given a value.

Nets acting as rules take a list of values and output a value.

Figure 8:
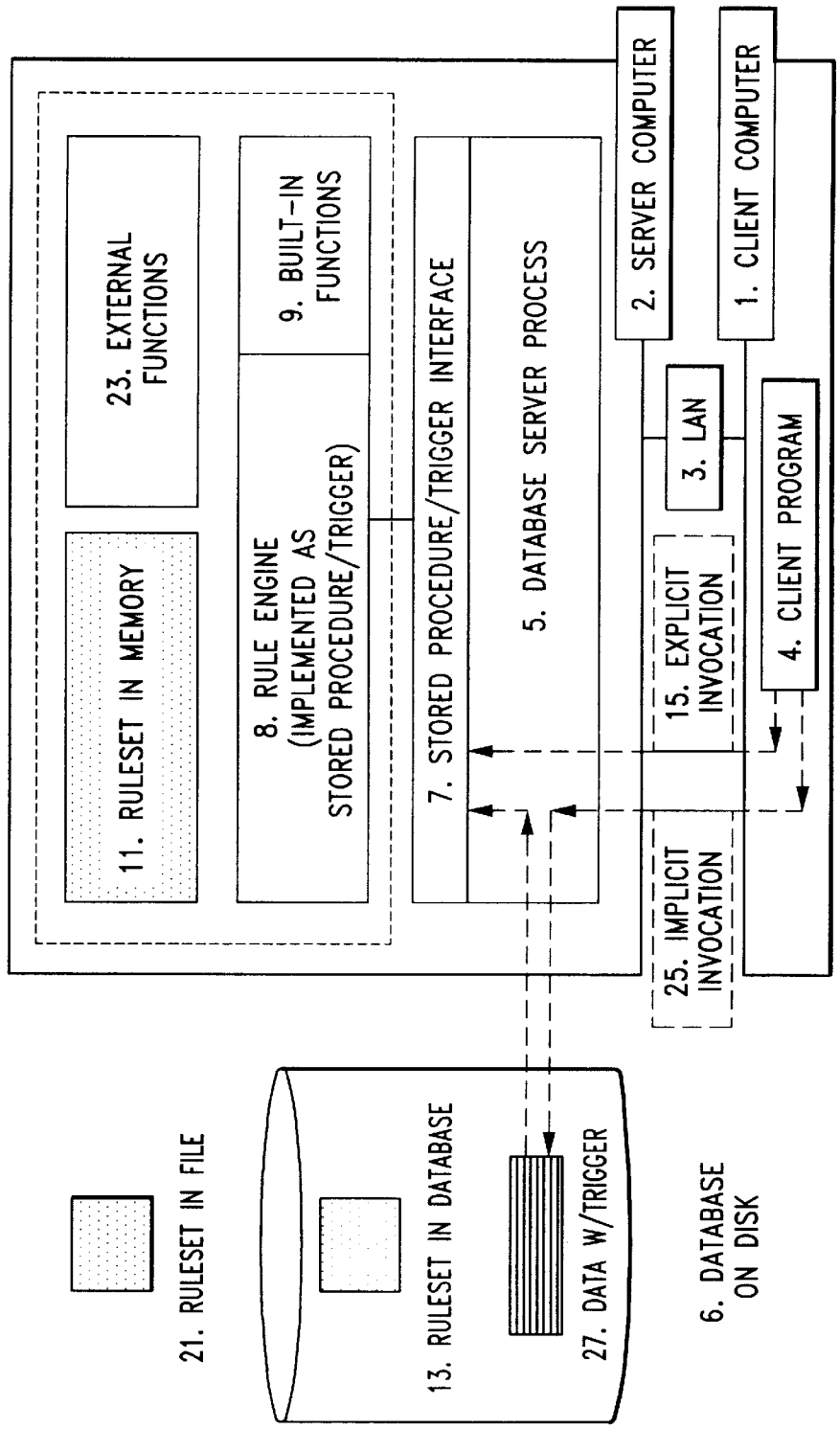
FIG. 8 is a schematic diagram of the rules engine of the present invention in a client/server environment.

FIG. 8 shows the execution of the rules engine of the present invention in a client/server environment.

The hardware environment consists of a client computer 1 connected to a server computer 2 via a Local Area Network (LAN) 3. While a LAN is the most common communications link between client and server, other kinds of communications links may be employed, such as thin clients (Internet browser) with Internet connections, serial communications, or interprocess communications between a client and server program on a single multitasking computer.

The client computer executes an application-specific client program 4 which makes database requests through the LAN to a database server process 5 executing on the server computer. The database server is the multi-model database management system described in U.S. Pat. Nos. 5,611,076 and 5,713,014, the specifications and drawings of which are hereby incorporated by reference herein in their entireties. The database itself resides on disk 6.

The database server has a stored procedure interface 7 for executing stored procedures on the server computer in order to reduce client/server communications overhead. The present invention extends the stored procedure concept to execute arbitrary rulesets through a rule engine 8 implemented in such a manner as to appear to the database server 5 as a stored procedure.

model the client program uses, relational, object-oriented, navigational, or other. This is possible only with the multi-model database. A preferred embodiment utilizes execution of a ruleset trigger via the relational model, but this invention is not limited to the relational model by any means.

Figure 9:
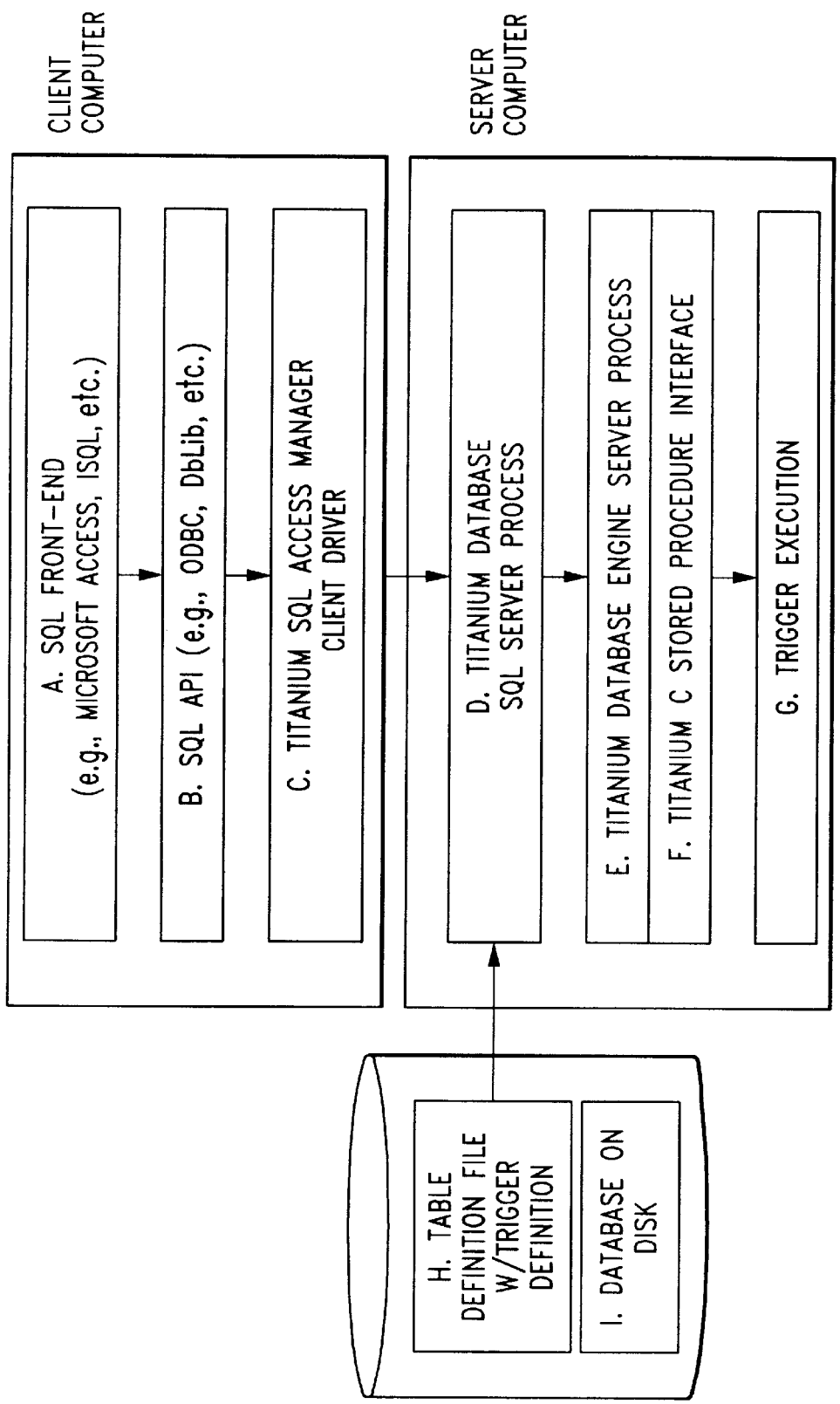
FIG. 9 is a schematic diagram of the execution of a trigger of the present invention in a client/server environment.

FIG. 9 shows in more detail the execution of a trigger (Implicit Invocation) within the present invention Database and Rules Engine in a client/server environment. The hardware environment is the same as that shown in FIG. 8.

A trigger is an automatic invocation of a database sever stored procedure associated with certain data in the database. It may be associated with a change to the data or with just the action of reading the data. While conceptually the trigger may be used with all logical database models, this shows a trigger used with the relational logical model. The trigger is initiated by the client program, typically an SQL Front-End program A such as Microsoft Access. For example, a user may use the front-end to modify some data in the database, such as the salary of an employee. The SQL Front-End sends an SQL command such as UPDATE via the SQL API (B) to the database SQL client driver C.

The database SQL server process D reads the Table Definition File H containing a description of the relational view of this database. The Table Definition File is the same as described in U.S. Pat. No. 5,611,076. The table definition file may be a physically separate file or may be contained within the database on disk (preferred embodiment).

Included in the table definition file is a trigger definition for the table being accessed. An example table definition file with trigger definitions using the Rules Engine is shown in FIG. 10. The CSP keyword is an acronym for C Stored Procedure.

The SQL command is analyzed by the Database SQL Server Process. The name of the table(s) referenced in the SQL command is extracted and compared the tables defined in the definition file. If the table being referenced has a trigger, and that trigger is for the SQL command being given in this instance, the SQL Server Process requests that the C Stored Procedure named in the trigger definition be executed by the Database Engine Server process E via the Stored Procedure interface F embedded in the engine. This executes the trigger G, which in the present invention is the rules engine executing a rule set.

The separation of the Database SQL Server Process and the Database Engine Process is a particular embodiment. In FIG. 8, only a single database server process is shown; in that figure both the SQL server functionality and the Engine server functionally are included in the single process, which is preferred.

The following sample rule set illustrates an example of a rule set that is triggered to execute whenever the employee database table of FIG. 10 is updated. The rules enforce a maximum salary cap for the employees:

ruleset: emps
options:
   debug messages=true
   pre trigger=false
   post trigger=true
goal: allow adjustment
atom: salary of employee
func: empsal
atom: maximum for department
func: deptmax
atom: average for department
func: deptavg
atom: cancel adjustment
func: cancel_adjustment
atom: review adjustment
func: review_adjustment
if: salary of employee>average for department+10000
then: cancel adjustment
reason: salary of employee cannot exceed maximum for department
if: salary of employee<average for department
then: review adjustment
reason: examine why employee is below average The above rule set definition calls various C Stored Procedures (CSPs) and is itself a CSP when compiled.

Figure 11:
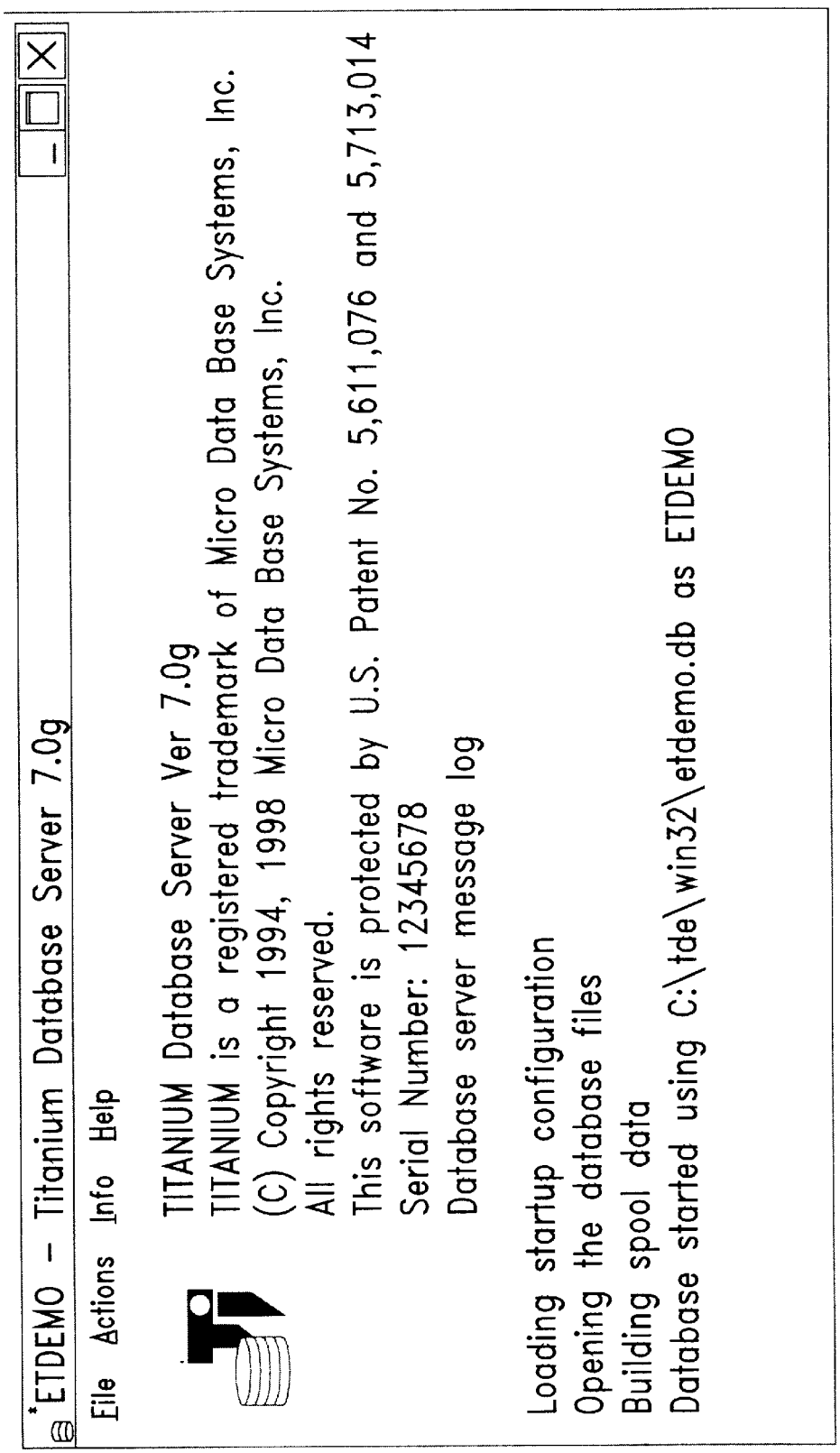
FIGS. 11–20 are user display screens illustrating the steps in the invocation and execution of a trigger and ruleset according to the present invention.
Figure 12:
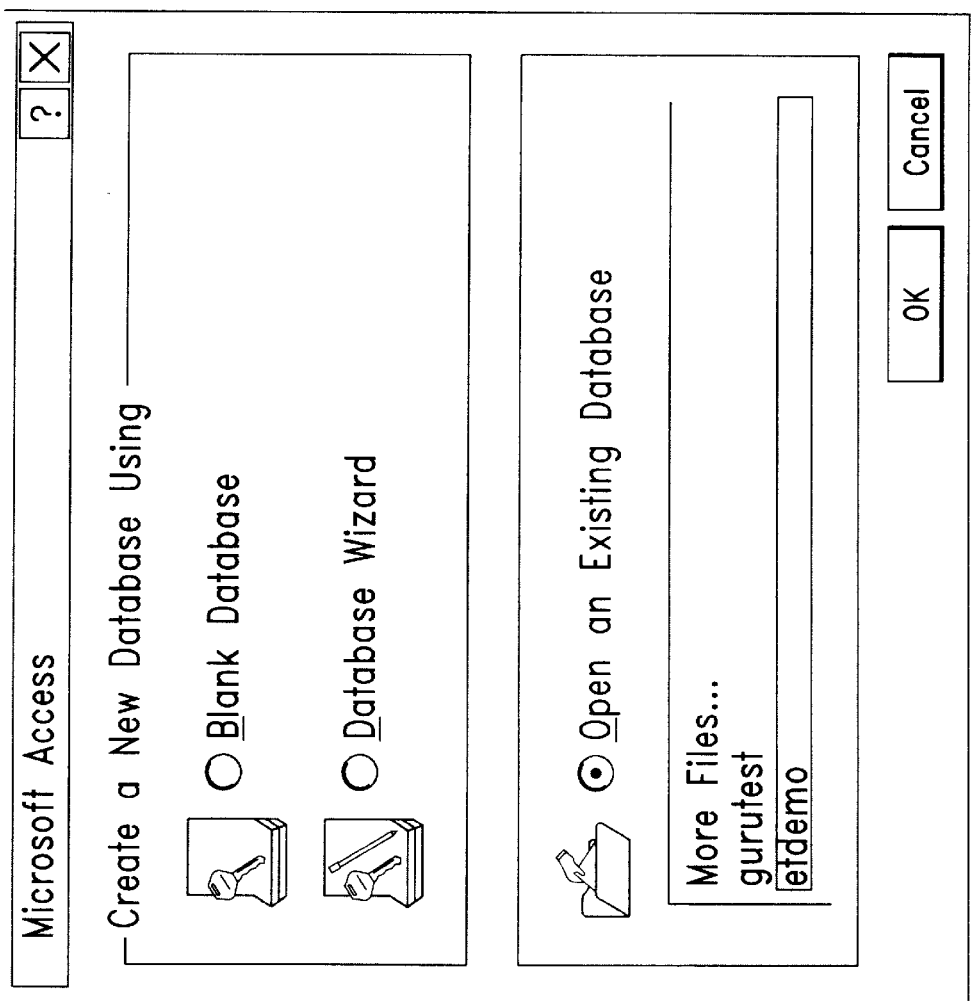
Figure 13:
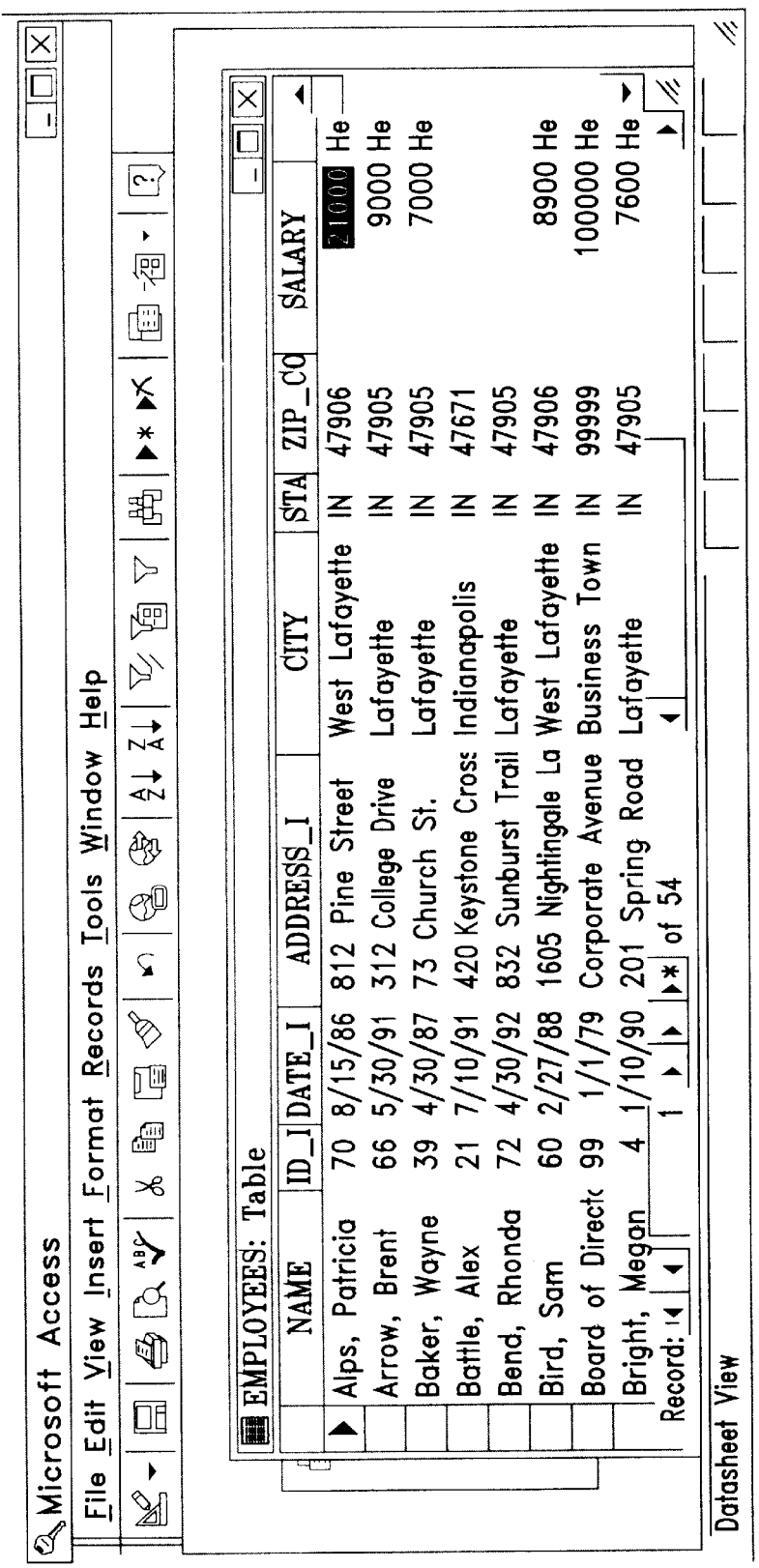
Figure 14:
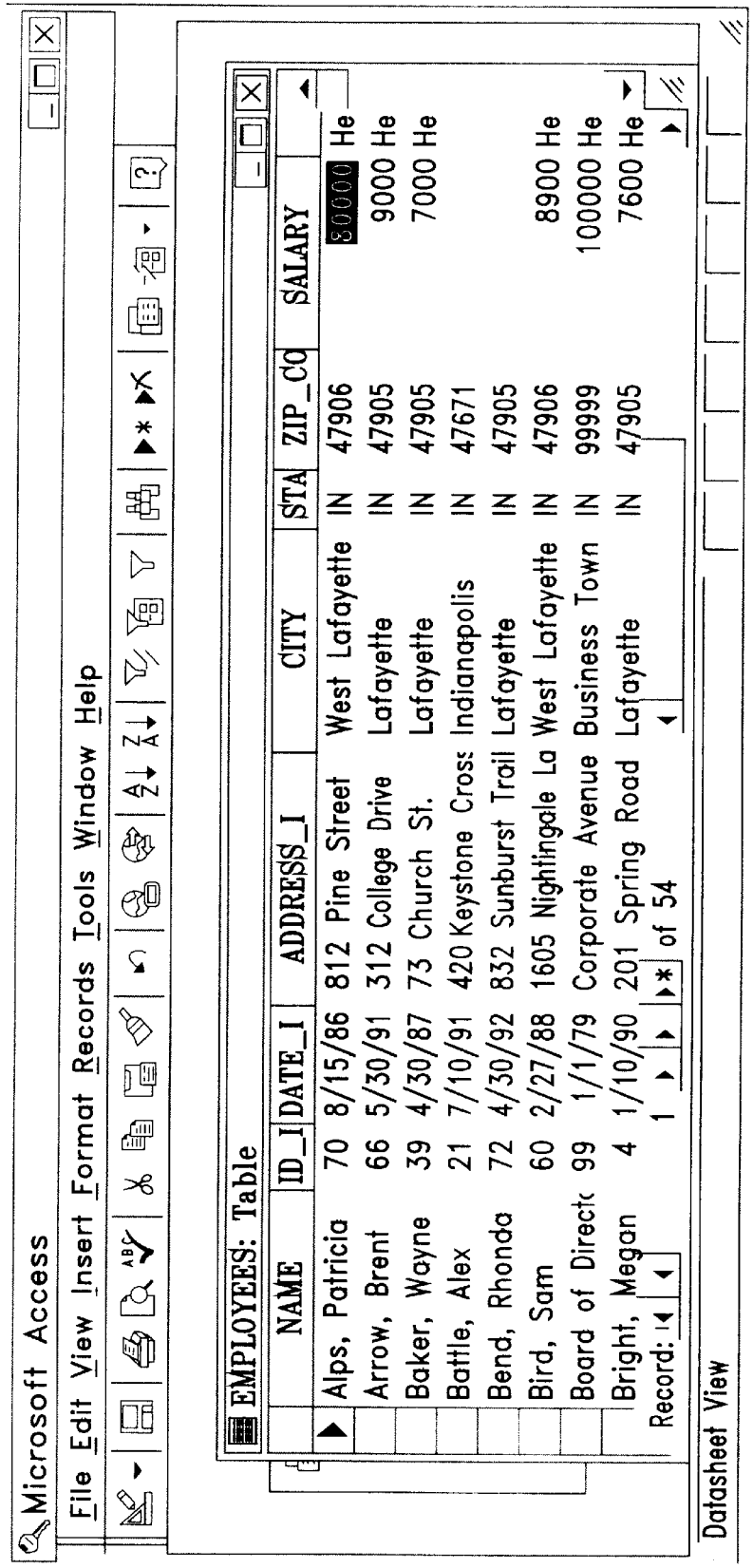

The database and ruleset of the present example are stored and executed using a TITANIUM database server available from Micro Data Base Systems, Inc., P.O. Box 2438, West Lafayette, Ind. 47906-0438. FIG. 11 illustrates the start-up screen of the TITANIUM database server, in which the database illustrated in FIG. 10 is started. FIG. 12 illustrates the screen displayed for the SQL front-end execution of opening the database ETDEMO. In FIG. 13, the database has been opened and the information stored therein is displayed on the screen. The highlighted area illustrates a salary figure for Patricia Alps, which is to be changed from the current value of $21,000 to a new value of $80,000. FIG. 14 illustrates the display screen wherein the user of the database has entered a value of $80,000 for the salary.

Figure 15:
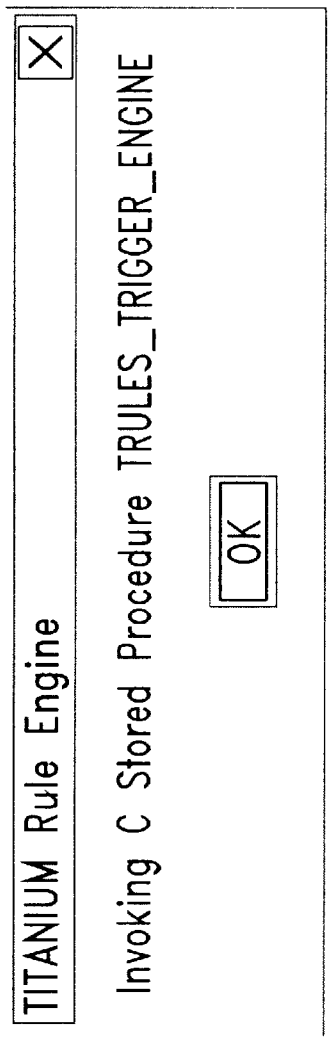
Figure 16:
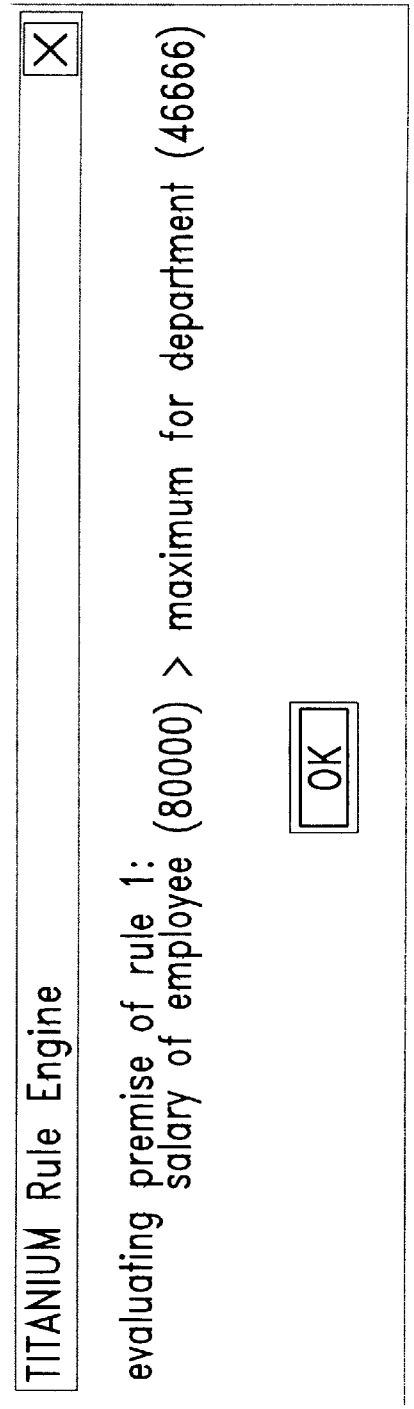
Figure 17:
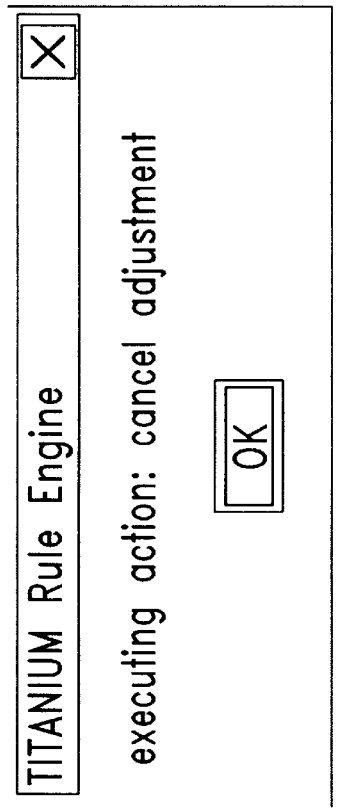
Figure 18:
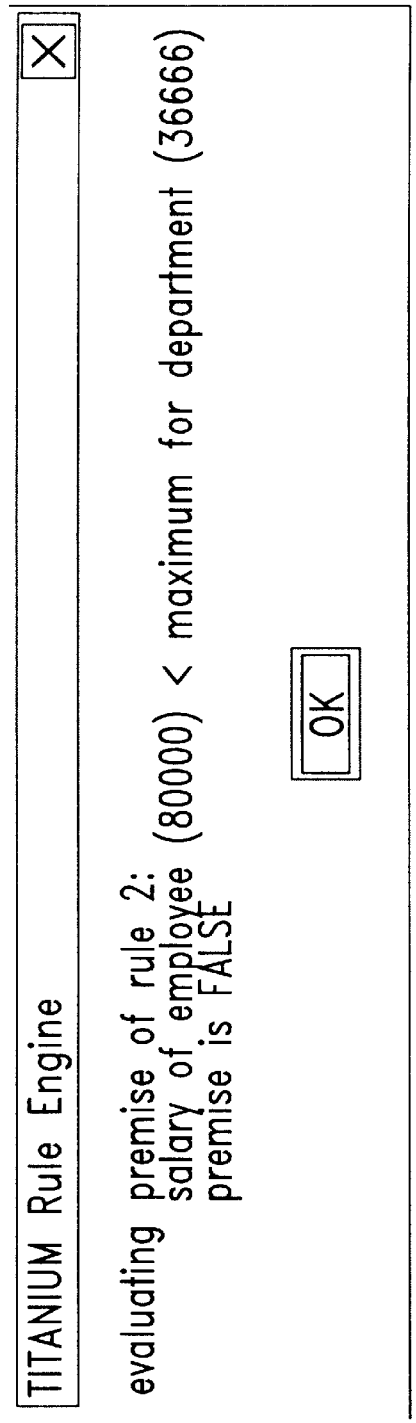
Figure 19:
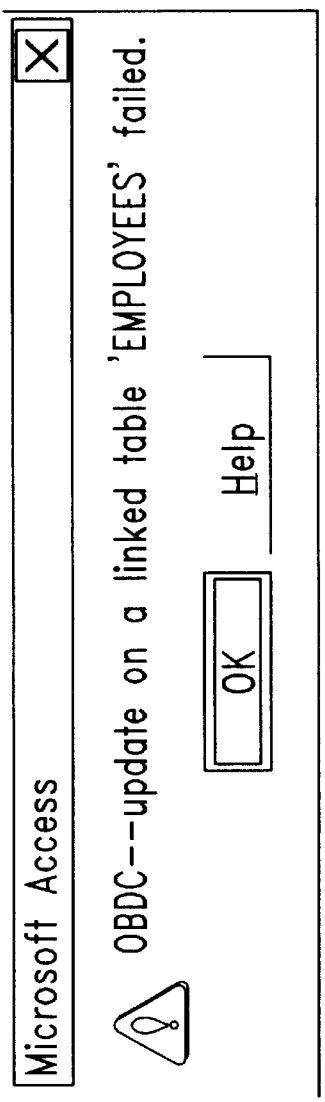
Figure 20:
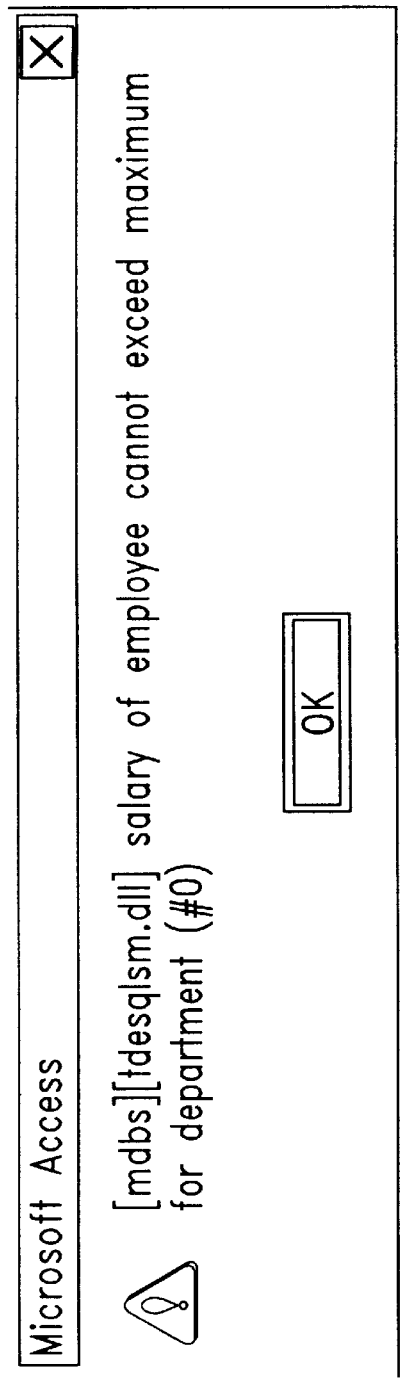

As shown in FIG. 10, the database includes a trigger which is to be executed whenever any of the data within the database table is updated. FIG. 15 illustrates a display screen which informs the user that the above ruleset is being invoked because of the attempted change to the database data. FIG. 16 is a display screen informing the user that the rules engine is evaluating the premise of rule 1, namely checking to see if the salary of the employee is greater than the maximum salary for the department. The rules engine determines if this premise is true and therefore executes the action at FIG. 17, which is to cancel the requested salary adjustment. At FIG. 18, the rules engine evaluates the premise of rule 2, namely whether the salary of the employee is less than the average for the department. This premise is evaluated as false, therefore, the screen of FIG. 19 indicates to the user that the database update to the employees table has failed. FIG. 20 displays a message to the user as to the reason for the failure, namely that the salary of the employee cannot exceed the maximum for the department.

Figure 21:
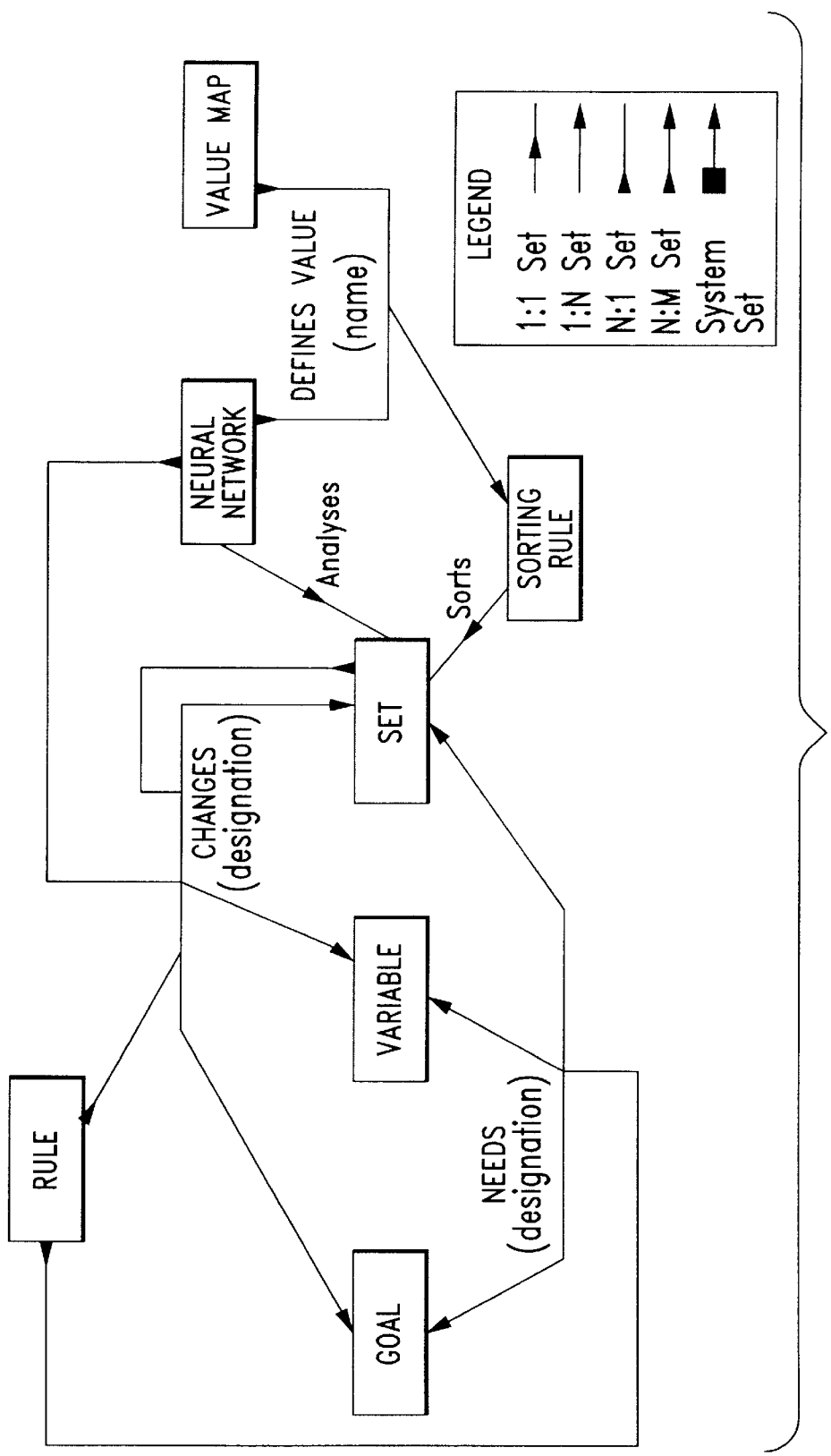
FIG. 21 is a rule-space ER diagram according to the present invention.

FIG. 21 illustrates a Rule E/R diagram of the present invention.

Figure 22:
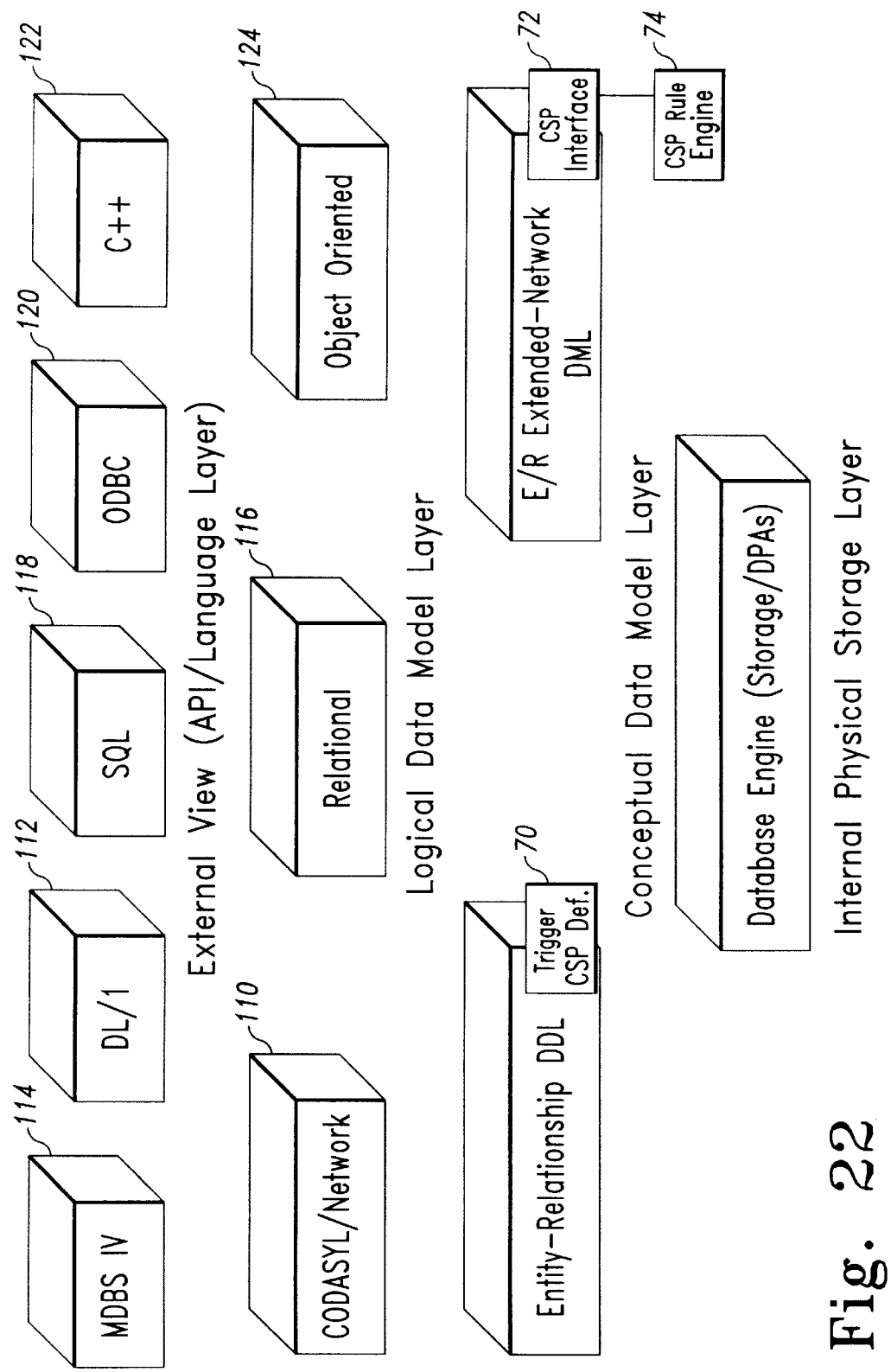
FIG. 22 is a schematic diagram of various interfaces and logical models supported by a prior multi-model database management system, to which have been integrated a Trigger Definition, a CSP Interface, and a CSP Rule Engine of the present invention.

Referring now to FIG. 22, there is illustrated the relationship between the rule engine and triggers of the present invention and a multi-model database. Specifically, the database illustrated in FIG. 22 is described in FIG. 9 of U.S. Pat. No. 5,611,076, the specification and drawings of which have been incorporated herein by reference hereinabove. As can be seen with reference to FIG. 22, the multi-model database has been extended with a trigger definition using a C Stored Procedure (CSP) in the entity-relationship DDL. Furthermore, a CSP interface 72 has been integrated into the E/R extended-network DML, which invokes the CSP rule engine 74. Because the CODASYL/Network 110, relational 116, and object oriented 124 logical models all use the E/R DDL and the E/R DML, the rule engine 74 is available to all.

Figure 23:
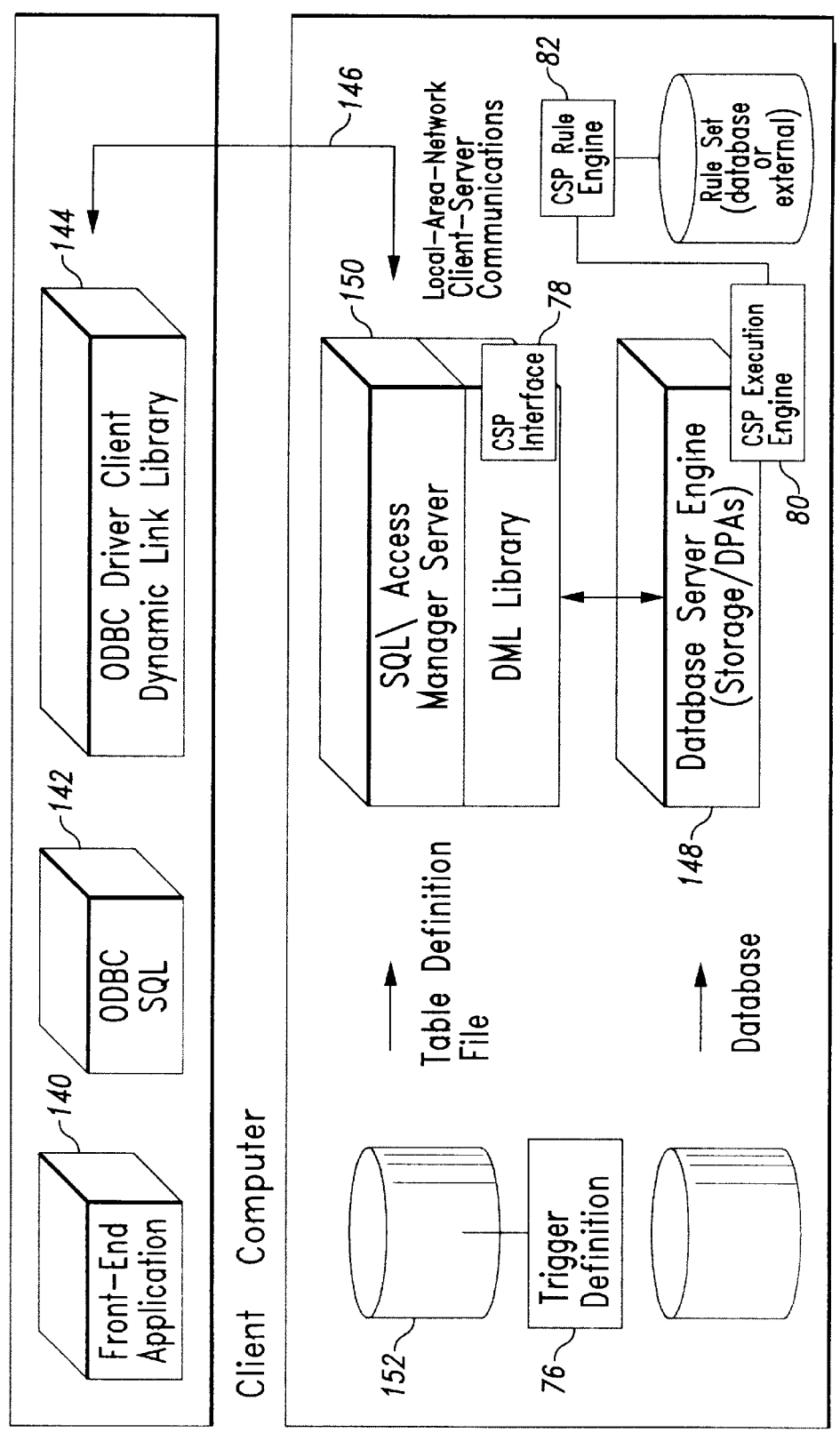
FIG. 23 is a schematic diagram of a prior art SQL implementation for an example front-end application, to which have been added a relational trigger definition, a CSP Interface, a CSP Execution Engine and a CSP Rule Engine of the present invention.

Referring now to FIG. 23, there is illustrated an SQL implementation for a front-end application, as described in U.S. Pat. No. 5,713,014 (the description and drawings of which have been incorporated herein by reference hereinabove), which has been extended with a relational trigger definition 76 in the table definition file 152, a CSP interface 78 in the DML library, a CSP execution engine 80 in the database server engine 148, which invokes a CSP rule engine 82, which accesses rules stored either in the database (the preferred embodiment) or externally (an alternative embodiment).

Triggers

Triggers may be setup to be executed for SELECT, DELETE, UPDATE, and INSERT operations. Rules may also be associated with a transaction and executed (by means of a trigger) on transaction begin, commit, or abort. In other words, rules may be executed even when data in the database is not changed. All triggers use the same structures for input and output. Triggers execute both before and after their triggering operations. The following sections illustrate features of a preferred embodiment of the triggers of the present invention, designed for use with the TITANIUM database described hereinabove.

Input Structure

The input structure, TDC_SQLCSP_TRIGGER_INPUT, consists of two fields: PreExecuteFlag and set Names.

The triggered CSP can test preExecuteFlag to determine the state of the operation. The preExecuteFlag can have one of three values:

TABLE I preExecuteFlag values for triggers

| PreExecuteFlag Value | State of the triggering operation |
| --- | --- |
| TDC_SQL_PRETRIGGER | SQL operation has not yet begun |
| TDC_SQL_POSTTRIGGER | SQL operation has completed successfully |
| TDC_SQL_FAILURETRIGGER | SQL operation has failed | setNames contains the names of the sets that SQL Access Manager chooses to best execute the query, based upon any WHERE clause. If only one FROM clause is given in the TDF, then the set names are fixed. If multiple FROM lines are given in the TDF for a given table, then the best match to the query is used.

Searching setNames

If the table uses multiple FROM clauses, it may be necessary to search setNames to see which was used. In such a case the following FindSet function can be useful. For example, if there are two paths, EMPLOYEES_BY_NAME and EMPLOYEES_BY_ID, the path chosen by SQL Access Manager can be determined as follows:

Char *primeSet;
PrimeSet=FindSet (input, "EMPLOYEES_BY_NAME", "EMPLOYEES_BY_ID", The determined set name can then be used in navigation and retrieval.

```
/*
** Find which from a NULL terminated list of sets is used.
*/
static char *Findset (struct TriggerInput *input, ...)
{
    int i;
    va_list arg_ptr;
    /* Setup the var-args functionality. */
    /* Scan each name. */
    for (i=0; i<16; i++) {
        char *setName = input>setNames[i];
        char *searchName;
        /* Setup the varargs pointer. */
        va_start (arg_ptr, input);
        /* Make sure a name is given. */
        if (setName[0] == 0)
            break;
        while ((searchName = va_arg(arg_ptr, char *))
            ! NULL) {
            /* Test the name. */
            if (strcmp (setName, searchName) == 0) {
                va_end (arg_ptr);
                return input->setNames [i];
            }
        }
        va_end(arg_ptr);
    }
    return NULL;
}
```

Output Structure

The output structure, TDC_SQLCSP_TRIGGER_OUTPUT, consists of two fields: returnCode and buffer.

returnCode provides the results of the triggered CSP. The returnCode can have one of three values:

TABLE II

Trigger return values

| returnCode Value | Results of the triggered CSP |
| --- | --- |
| TDC_SQL_TRIGGER_SUCCESS | CSP executed successfully |
| TDC_SQL_TRIGGER_RETRY | CSP failed, retry the operation |
| TDC_SQL_TRIGGER_FAIL | CSP failed, abort the operation | buffer is a message buffer area that can be set to any text message. If the returnCode is TDC_SQL_TRIGGER_FAIL, SQLError displays buffer to the client.

SELECT Trigger Example

The following CSP is code for a SELECT trigger. In this example the user is granted an exclusive lock on the EMPLOYEE record type before the query executes, and the lock is released afterward.

```
TDE_CSP SelectTrigger(char *c_args,
    struct TDS_SQLCSP_Trigger_Input *input,
    struct TDS_SQLCSP_Trigger_Output *output)
{
    /*
    ** Get exclusive access to EMPLOYEE records while the
    ** query executes.
    */
    if (TDC_SQL_PRETRIGGER == input->preExecuteFlag) {
        if (0 != TDE_LockRecordType Exclusive(" EMPLOYEE" )) {
            output->returnCode = TDC_SQL_TRIGGER_FAIL;
            strcpy (output->buffer,
                " Could not establish EMPLOYEE lock.");
            return;
        }
    }
    /* Release the lock on the EMPLOYEE records. */
    if (TDC_SQL_POSTTRIGGER == input->preExecuteFlag) {
        TDE_FreeRecordTypeLock(" Employee" );
    }
    output->returnCode = TDC_SQL_TRIGGER_SUCCESS;
    return;
}
```

DELETE Trigger Example

The following CSP is code for a DELETE trigger, which checks to make sure that at least one employee (specifically, employee #1) remains in the database.

```
TDE_CSP DeleteTrigger(CHAR *c_args,
    struct TDS_SQLCSP_Trigger_Input *input,
    struct TDS_SQLCSP_Trigger_Output *output)
{
    char        *testSet;
    EMPLOYEE    emp;
    /* Find which set we used to execute the query. */
    testSet = FindSet (input, " ALLEMPS", NULL);
    if (testSet == NULL) {
        output->returncode = TDC_SQL_TRIGGER_FAIL;
        strcpy (output->buffer, " Cannot find needed sets.");
        return;
    }
    /* If post-delete, make sure there are still employees. */
    if (TDC_SQL_POSTTRIGGER == input->preExecuteFlag) {
        unsigned long count;
        if (TDE_GetMemberCount (testSet, &count) != 0) {
            output->returncode = TDC_SQL_TRIGGER_FAIL;
            strcyp (output->buffer,
                "Error obtaining record count."
            return;
        }
        if (count == 0) {
            output->returnCode = TDC_SQL_TRIGGER_FAIL;
            strcpy (output->buffer,
                "Cannot delete all employees." );
            return;
        }
        return;
    }
    /* Get the data. */
    if (TDE_GetMember(testSet, &emp)) {
        output->returnCode = TDC_SQL_TRIGGER_FAIL;
        strcpy(output->buffer,
            " Unable to get data from database." );
        return;
    }
    /* test whether to allow the delete. */
    if (emp.empid == 1 &&
        TDC_SQL_PRETRIGGER == input->preExecuteFlag)
```

```
-continued

{
    output->returnCode = TDC_SQL_TRIGGER_FAIL;
    strcpy (output->buffer,
        " Don't delete the first employee." );
    return;
}
/* Can delete everyone else. */
output->returnCode = TDC_SQL_TRIGGER_SUCCESS;
return;
}
```

Note: Post-delete aborts only work if a PIF is active; otherwise the client receives the error "Error: unable to restore data without transactions" if output->returnCode returns TDC_SQL_TRIGGER_FAIL.

UPDATE Triggers

UPDATE triggers are similar to delete triggers. The following CSP is code for an UPDATE trigger which does not allow employees 1 and 2 to be updated. Employee 1 is refused before the UPDATE occurs. Employee 2 is refused after the UPDATE occurs so the change is rolled back.

```
TDE_CSP UpdateTrigger(char *c_args,
    struct TDS_SQLCSP_Trigger_Input *input,
    struct TDS_SQLCSP_Trigger_output *output)
{
    char            *testSet;
    EMPLOYEE        emp;
    /*Find which set we used to execute the query. */
    testSet = FindSet (input, " ALLEMPS", NULL);
    if (testSet == NULL) {
        output->returnCode=TDC_SQL_TRIGGER_FAIL;
        strcpy(output->buffer, " Cannot find needed sets." );
        return;
    }
    /* Get the data. */
    if (TDE_GetMember(testSet, &emp)) {
        output->returnCode = TDC_SQL_TRIGGER_FAIL;
        strcpy (output->buffer,
            " Unable to get data from database." );
        return;
    }
    /* Test whether to permit the update. */
    if (emp.empid == 1 &&
        TDC_SQL_PRETRIGGER == input->preExecuteFlag)
    {
        output->returnCode = TDC_SQL_TRIGGER_FAIL;
        strcpy (output->buffer,
            " Don't update the first employee." );
        return;
    }
    /*Test whether to abort the update. */
    if (emp.empid == 2 &&
        TDC_SQL_POSTTRIGGER == input->preExecuteFlag)
    {
        output->returnCode = TDC_SQL_TRIGGER_FAIL;
        strcpy (output->buffer,
            " Don't update the second employee." );
        return;
    }
    /* Can update everyone else */
    output->returnCode = TDC_SQL_TRIGGER_SUCCESS;
    return;
}
```

Post-update aborts are allowed without a PIF, but with the following limitations:

The transaction rolls back one item at a time, which can be slow.

The risk of logical inconsistency increases if a fault occurs during rollback.

BLOB items cannot be rolled back.

INSERT Triggers

The following CSP is code for an INSERT trigger. The trigger evaluates the day of the week before executing the query, to ensure that no EMPLOYEE records are inserted on Sunday. It also validates the ID number of the newly-created record.

It isn't usually necessary to evaluate setNames for an insert trigger, since the inserted record is the current of run unit.

```
TDE_CSP InsertTrigger(char *c_args,
    struct TDS_SQLCSP_Trogger_Input *input,
    struct TDS_SQLCSP_Trigger_Output *output)
{
    time_t long_time;
    EMPLOYEE emp;
    /* Test whether to allow the insert. */
    if (TDC_SQL_PRETRIGGER == input->preExecuteFlag)
    {
        /* Check the day of the week. */
        time (&long_time)
        if (localtime(&long_time)->tm_wday == 0) {
            output->returnCode = TDC_SQL_TRIGGER_FAIL;
            strcpy (output->buffer,
                "Don't insert EMPLOYEES on Sunday." );
            return;
        }
    }
    /* Get the data. */
    if (TDE_GetCurrent(&emp)) {
        output->returnCode = TDC_SQL_TRIGGER_FAIL;
        strcpy (output->buffer,
            " Unable to get data from database." );
        return;
    }
    /*Test whether to abort the insert. */
    if (emp.empid, 0 &&
        TDC_SQL_POSTTRIGGER == input->preExecuteFlag)
    {
        outpu->returnCode = TDC_SQL_TRIGGER_FAIL;
        strcpy (output->buffer,
            " Employee ID cannot be negative." );
        return;
    }
    /* Can insert otherwise. */
    output->returnCode = TDC_SQL_TRIGGER_SUCCESS;
    return;
}
```

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed:

1. A multi-model computer database storage system, comprising:

a data storage medium adapted to store a plurality of pieces of information;

at least one piece of data stored in the data storage medium;

at least one rule set stored in the data storage medium, each said at least one rule set comprising a plurality of rules that are each executed whenever said rule set is triggered;

at least one trigger, wherein each said at least one trigger causes execution of at least one of said rule sets upon the occurrence of a predetermined event; and a cap value, wherein a database engine uses the cap value to limit the number of times the rule can be fired.

2. The system of claim 1, wherein each rule comprises:
a premise;
an action, wherein the action is performed if the premise is determined to be true; and
an alternate action, wherein the alternate action is performed if the premise is determined to be false.

3. The system of claim 1, wherein the predetermined event comprises a change of value of a predetermined one of the at least one piece of data.

4. The system of claim 2, wherein each said at least one rule further comprises:
a start time; and
an end time;
wherein the rule may only be executed if a current time is on or after the start time and on or before the end time.

5. The system of claim 4, wherein each said at least one rule further comprises:
a version number indicating an order in which rules are modified over time.

6. The system of claim 4, wherein the start time is in the future, such that the rule may not be fired until the start time equals the current time.

7. The system of claim 1, wherein each said at least one rule further comprises:
an evaluation flag, wherein setting the evaluation flag cause the rule to pause when its trigger is activated, so that a user may elect to skip the rule, proceed to the next rule, or fire the rule.

8. The system of claim 1, wherein said at least one rule comprises a neural network.

9. The system of claim 2, wherein said premise comprises a fuzzy query.

10. A multi-model computer database storage system, comprising:
a data storage medium adapted to store a plurality of pieces of information;
a plurality of data stored in the data storage medium according to a plurality of logical data models;
at least one rule stored in the data storage medium;
a database engine operative to store and retrieve data to and from the data storage medium according to any of the plurality of logical data models;
a rule engine integrated with the database engine such that said at least one rule can be executed in the context of any of the plurality of logical data models; and
rule correctness feedback, whereby a user can indirectly modify said rule engine by indicating whether a result of said execution of said rule was correct.

11. The system of claim 10, wherein each rule comprises:
a premise;
an action, wherein the action is performed if the premise is determined to be true;
an alternate action, wherein the alternate action is performed if the premise is determined to be false; and
a trigger, wherein the trigger causes evaluation of the premise upon the occurrence of a predetermined event.

12. The system of claim 11, wherein the predetermined event comprises a change of value of a predetermined one of the at least one piece of data.

13. The system of claim 11, wherein each said at least one rule further comprises:
a start time; and
an end time;
wherein the rule may only be executed if a current time is on or after the start time and on or before the end time.

14. The system of claim 13, wherein each said at least one rule further comprises:
a version number indicating an order in which rules are modified over time.

15. The system of claim 13, wherein the start time is in the future, such that the rule may not be fired until the start time equals the current time.

16. The system of claim 11, wherein each said at least one rule further comprises:
an evaluation flag, wherein setting the evaluation flag causes the rule to pause when its trigger is activated, so that a user may elect to skip the rule, proceed to the next rule, or fire the rule.

17. The system of claim 11, wherein each said at least one rule further comprises:
a cap value, wherein the cap value limits the number of times the rule can be fired.

18. The system of claim 10, wherein said at least one rule comprises a neural network.

19. The system of claim 10, wherein said premise comprises a fuzzy query.

20. A multi-model computer database storage system, comprising:
a data storage medium adapted to store a plurality of pieces of information;
at least one piece of data stored in said data storage medium; and
a rule space comprising a plurality of rules, at least one of said rules comprising a fuzzy logic operation, at least one of said rules comprising at least one neural network, and at least one of said rules comprising:
a premise;
an action, wherein said action is performed if said premise is determined to be true; and
an alternate action, wherein said alternate action is performed if said premise is determined to be false;
said rule space further comprising goals, variables, sets, sorting rules, value maps, and neural nets;
said rule space further comprising a language for defining and implementing said rules, said language having syntax for rules other than "if-then" rules;
at least one trigger that causes said rule space to perform an operation when a user changes a value of a predetermined one of the at least one piece of data, said operation comprises providing output to said user indicating both a result of said operation and bases for said result;
rule correctness feedback, whereby said user can indirectly modify said rule space by indicating whether said result of said operation was correct; and
an integrated development environment that is operative to simulate said rule space without altering data in said data storage medium.

21. The system of claim 20, wherein the language for defining and implementing said rules is end user oriented.

22. The system of claim 20, wherein the rule correctness feedback comprises fuzzy logic.

23. A multi-model computer database storage system, comprising:

a database storage medium adapted to store a plurality of pieces of information;

at least one piece of data stored in the data storage medium;

at least one rule stored in the data storage medium, said at least one rule comprising:

a premise;

an action, wherein the action is performed if the premise is determined to be true;

an alternate action, wherein the alternate action is performed if the premise is determined to be false;

a trigger, wherein the trigger causes evaluation of the premise upon the occurrence of a predetermined event, and a debugging tool operative to graphically display at least one of the at least one rule and at least one of the at least one piece of data and logical interconnections therebetween, wherein said display of a particular rule or data changes appearance as said particular rule is executed and said particular data is utilized in a rule execution.

* * * * *